United States Patent
Miyajima et al.

(10) Patent No.: US 11,292,930 B2
(45) Date of Patent: Apr. 5, 2022

(54) TEXTILE PRINTING INK JET INK COMPOSITION SET AND RECORDING METHOD

(71) Applicant: Seiko Epson Corporation, Tokyo (JP)

(72) Inventors: Yoshitaka Miyajima, Matsumoto (JP); Yuki Wakushima, Matsumoto (JP); Nao Kozaka, Matsumoto (JP); Hideki Oguchi, Shiojiri (JP); Takuya Sonoyama, Fujimi (JP)

(73) Assignee: Seiko Epson Corporation

( * ) Notice: Subject to any disclaimer, the term of this patent is extended or adjusted under 35 U.S.C. 154(b) by 228 days.

(21) Appl. No.: 16/273,235

(22) Filed: Feb. 12, 2019

(65) Prior Publication Data
US 2019/0249025 A1 Aug. 15, 2019

(30) Foreign Application Priority Data

Feb. 13, 2018 (JP) .............................. JP2018-022901

(51) Int. Cl.
*C09D 11/40* (2014.01)
*C09D 11/037* (2014.01)
*C09D 11/328* (2014.01)
*D06P 5/30* (2006.01)
*C09D 11/00* (2014.01)
*C09D 1/00* (2006.01)
*C09D 4/00* (2006.01)
*C09D 5/00* (2006.01)
*C09K 3/00* (2006.01)

(52) U.S. Cl.
CPC ............ *C09D 11/40* (2013.01); *C09D 11/037* (2013.01); *C09D 11/328* (2013.01); *D06P 5/30* (2013.01)

(58) Field of Classification Search
USPC ................................. 106/31.01, 31.13, 31.27
See application file for complete search history.

(56) References Cited

U.S. PATENT DOCUMENTS

| | | | |
|---|---|---|---|
| 5,250,121 | A | 10/1993 | Yamamoto et al. |
| 5,674,314 | A | 10/1997 | Auslander et al. |
| 5,897,694 | A | 4/1999 | Woolf |
| 6,007,611 | A | 12/1999 | Mheidle et al. |
| 6,153,263 | A | 11/2000 | Haruta et al. |
| 6,293,667 | B1 | 9/2001 | Gregory et al. |
| 6,723,137 | B1 | 4/2004 | Hakamada et al. |
| 8,349,029 | B2 | 1/2013 | Worner et al. |
| 2003/0172840 | A1 | 9/2003 | Blank et al. |
| 2004/0003755 | A1 | 1/2004 | Fukumoto et al. |
| 2005/0036018 | A1* | 2/2005 | Yanagihara ............... D06P 5/30 347/100 |
| 2005/0172856 | A1 | 8/2005 | Hasemann |
| 2007/0101900 | A1 | 5/2007 | Wheeler et al. |
| 2007/0266887 | A1* | 11/2007 | Koganehira .......... C09D 11/322 106/31.6 |
| 2008/0032098 | A1 | 2/2008 | Hornby et al. |
| 2012/0216356 | A1 | 8/2012 | Worner et al. |
| 2013/0328979 | A1 | 12/2013 | Shimizu et al. |
| 2014/0157530 | A1 | 6/2014 | Murai |
| 2014/0375733 | A1 | 12/2014 | Murai et al. |
| 2015/0166807 | A1 | 6/2015 | Komatsu |
| 2015/0252200 | A1 | 9/2015 | Kagata et al. |
| 2016/0272834 | A1 | 9/2016 | Kobayashi et al. |
| 2016/0326384 | A1 | 11/2016 | Chen et al. |
| 2017/0009092 | A1 | 1/2017 | Gotou et al. |
| 2017/0275485 | A1 | 9/2017 | Oki et al. |
| 2018/0030292 | A1 | 2/2018 | Gotou et al. |
| 2018/0086929 | A1* | 3/2018 | Hayashi .................... D06P 5/30 |
| 2018/0179406 | A1* | 6/2018 | Miyajima .............. C09D 11/38 |
| 2018/0179407 | A1 | 6/2018 | Miyajima et al. |
| 2018/0215939 | A1* | 8/2018 | Mizuno .................. C09D 11/54 |
| 2018/0244934 | A1 | 8/2018 | Murai et al. |
| 2019/0031899 | A1 | 1/2019 | Oki et al. |
| 2019/0093283 | A1 | 3/2019 | Miyajima et al. |
| 2019/0100669 | A1 | 4/2019 | Murai et al. |
| 2019/0105919 | A1 | 4/2019 | Katsuragi |
| 2019/0249025 | A1 | 8/2019 | Miyajima et al. |
| 2019/0284426 | A1 | 9/2019 | Matsuzaki et al. |
| 2019/0292393 | A1 | 9/2019 | Murai |
| 2020/0095443 | A1* | 3/2020 | Kozaka ................. D06P 1/6491 |

(Continued)

FOREIGN PATENT DOCUMENTS

| | | |
|---|---|---|
| CN | 102504648 A | 6/2012 |
| CN | 107163685 A | 9/2017 |

(Continued)

OTHER PUBLICATIONS

Aptoula et al., "Morphological Description of Color Images for Content-Based Image Retrieval", IEEE Transactions on Image Processing 18(11), Dec. 2009, pp. 2505-2517, 13 pages.

(Continued)

*Primary Examiner* — James E McDonough

(74) *Attorney, Agent, or Firm* — Harness, Dickey & Pierce, P.L.C.

(57) ABSTRACT

A textile printing ink jet ink composition set includes a textile printing ink jet ink composition having a hue angle ∠h° within a range of 260° or more and 310° or less and a chroma C* of 45 or less, which are specified in the CIELAB color space, on a textile printing product after textile printing; and a textile printing ink jet ink composition having a hue angle ∠h° within a range of 15° or more and 80° or less and a chroma C* of 65 or less, which are specified in the CIELAB color space, on a textile printing product after textile printing.

19 Claims, 2 Drawing Sheets

(56) References Cited

U.S. PATENT DOCUMENTS

2020/0095444 A1 3/2020 Hagiwara et al.
2020/0131390 A1* 4/2020 Sakuma ............... C07D 251/50

FOREIGN PATENT DOCUMENTS

| | | |
|---|---|---|
| DE | 10135042 A1 | 2/2003 |
| EP | 1357158 A1 | 10/2003 |
| EP | 2311917 A1 | 4/2011 |
| EP | 2412761 A1 | 2/2012 |
| EP | 3091056 A1 | 11/2016 |
| EP | 3299426 A1 | 3/2018 |
| JP | 61-002772 A | 1/1986 |
| JP | H08-259867 A | 10/1996 |
| JP | H11-012957 A | 1/1999 |
| JP | 2002-241639 A | 8/2002 |
| JP | 2004-359928 A | 12/2004 |
| JP | 2004-536180 A | 12/2004 |
| JP | 2009-227895 A | 10/2009 |
| JP | 2012-511591 A | 5/2012 |
| JP | 2014-062142 A | 4/2014 |
| JP | 2015-183311 A | 10/2015 |
| JP | 2016-044258 A | 4/2016 |
| JP | 2016-044259 A | 4/2016 |
| JP | 2016-135822 A | 7/2016 |
| JP | 2017-115094 A | 6/2017 |
| JP | 2017-214457 A | 12/2017 |
| JP | 2017-214668 A | 12/2017 |
| JP | 2018-109140 A | 7/2018 |
| WO | WO-2010-013649 A1 | 2/2010 |

OTHER PUBLICATIONS

Extended European Search Report for Application No. EP 17 20 8431 dated May 3, 2018 (8 pages).
Database WPI, Week 201651, Thomson Scientific, London, GB, AN 2016-459671, XP002780277 (2 pages), Dec. 2016.
Extended European Search Report for Patent Application No. EP18197517.8 dated Feb. 11, 2019 (11 pages).
Caprolactam datasheet, https: //www.chemenu.com/products/ CM200169, no date available; 2 pages.
Hansen Solubility Parameters Table from Diversified Enterprises, URL: https://www.accudynetest.com/solubility_table.html, 5 pages.
Database WPI, Week 201651, Thomson Scientific, London, GB, AN 2016-459671, XP002780327 (2 pages).
Database WPI, Week 201575, Thomson Scientific, London, GB, AN 2015-63684Y, (2 pages).
Database WPI, Week 198608, Thomson Scientific, London, GB, AN 1986-050894, (2 pages).
Database WPI, Week 201263, Thomson Scientific, London, GB, AN 2012-J53239 (3 pages).
Extended European Search Report for Patent Application No. EP 17208435.2 dated May 3, 2018 (10 pages).

* cited by examiner

TEXTILE PRINTING INK JET INK COMPOSITION SET AND RECORDING METHOD

BACKGROUND

1. Technical Field

The present invention relates to a textile printing ink jet ink composition set and a recording method.

2. Related Art

An ink jet recording method is a method of recording by ejecting ink droplets from fine nozzles and adhering the ink droplets to a recording medium. This method is characterized in that images with high resolution and high quality can be recorded at high speed by a relatively inexpensive apparatus. The ink jet recording method has many factors to be investigated, such as the properties of the inks used, recording stability, and the quality of the images formed, and not only an ink jet recording apparatus but also the ink compositions used are actively investigated.

Also, the ink jet recording method is used for dyeing (texture printing) fabrics and the like. A screen textile printing method, a roller textile printing method, and the like have been used as a textile printing method for fabrics (woven fabrics and nonwoven fabrics). However, various researches have been performed because it is advantageous to use the ink jet recording method from the viewpoint of productivity in various-kinds and small amounts, instant printability, etc.

Various performances are required for ink compositions used for textile printing ink jet recording, but performances not required for general ink compositions may be required from the viewpoint of dyeing fabrics. Therefore, textile printing ink jet ink compositions and sets thereof also have many factors to be investigated.

For example, an ink set including dye inks of the YMCK four colors (yellow, magenta, cyan, and black) is often used for ink jet textile printing. However, when such an ink set is used for ink jet textile printing, the hue range obtained by the screen textile printing method may not be completely reproduced. For example, International Publication No. 2010/13649 proposes a reactive dye ink set for ink jet textile printing, which includes a cyan ink composition containing C.I. Reactive Blue 15:1 and a magenta ink composition containing C.I. Reactive Red 245 with the intention of widening a color reproduction range, particularly a color reproduction range in the hue range of magenta-violet-blue-cyan.

As a result of extensive research of changes in color development, hues, and the like by a long-term outdoor exposure test of textile printing products of ink jet textile printing, the inventors found that a hue change with time easily occurs in a specific hue produced by color mixing (may be referred to as "composite" hereinafter) of a plurality of color inks, such as CMYK or the like. In particular, it was found that in the long-term outdoor exposure test of textile printing products, hue changes easily occur in the hues of bluish colors (colors with a hue angle ∠h° within a range of about 260° or more and 310° or less), such as dark blue, navy blue (Japanese Industrial Standard JIS custom color name), deep blue, prussian blue, blue, indigo blue, ultramarine blue, lapis lazuli blue, and the like, and the hues of brownish colors (colors with a hue angle ∠h° within a range of about 15° or more and 80° or less), such as light brown, brown (Japanese Industrial Standard JIS custom color name), dark brown, maroon, yellowish brown, reddish brown, blackish brown, and the like. The inventors suppose that one of the causes of changes in the hues is a difference in light resistance between the dyes contained in a plurality of inks.

SUMMARY

An advantage of some aspects of the invention is that it provides a textile printing ink jet ink composition set which can express, on a textile printing product, a color with a hue angle ∠h° within a range of 260° or more and 310° or less and a chroma C* of 45 or less and a color with a hue angle ∠h° within a range of 15° or more and 80° or less and a chroma C* of 65 or less and which forms a textile printing product having an image with good light resistance. Another advantage of some aspects of the invention is that it provides a recording method which can express, on a textile printing product, a color with a hue angle ∠h° within a range of 260° or more and 310° or less and a chroma C* of 45 or less and a color with a hue angle ∠h° within a range of 15° or more and 80° or less and a chroma C* of 65 or less and which forms a textile printing product with good light resistance.

The invention can be realized as embodiments or application examples.

According to an aspect of the invention, a textile printing ink jet ink composition set includes a textile printing ink jet ink composition having a hue angle ∠h° within a range of 260° or more and 310° or less and a chroma C* of 45 or less, which are specified in the CIELAB color space, on a textile printing product after textile printing, and a textile printing ink jet ink composition having a hue angle ∠h° within a range of 15° or more and 80° or less and a chroma C* of 65 or less, which are specified in the CIELAB color space, on a textile printing product after textile printing.

In the textile printing ink jet ink composition set according to the invention, the textile printing ink jet ink composition having a hue angle ∠h° within a range of 260° or more and 310° or less and a chroma C* of 45 or less, which are specified in the CIELAB color space, on a textile printing product after textile printing may contain one or more dyes selected from a chromium-containing dye and a copper-containing dye.

In the textile printing ink jet ink composition set according to the invention, the textile printing ink jet ink composition having a hue angle ∠h° within a range of 260° or more and 310° or less and a chroma C* of 45 or less, which are specified in the CIELAB color space, on a textile printing product after textile printing may contain the one or more dyes selected from a chromium-containing dye and a copper-containing dye at a total content of 2% by mass or more and 15% by mass or less relative to the total mass of the textile printing ink jet ink composition.

In the textile printing ink jet ink composition set according to the invention, the textile printing ink jet ink composition having a hue angle ∠h° within a range of 15° or more and 80° or less and a chroma C* of 65 or less, which are specified in the CIELAB color space, on a textile printing product after textile printing may contain one or more dyes selected from a chromium-containing dye and a metal-free dye having a naphthalene skeleton in its structure.

In the textile printing ink jet ink composition set according to the invention, the textile printing ink jet ink composition having a hue angle ∠h° within a range of 15° or more and 80° or less and a chroma C* of 65 or less, which are specified in the CIELAB color space, on a textile printing product after textile printing may the one or more dyes selected from a chromium-containing dye and a metal-free dye having a naphthalene skeleton in its structure at a total content of 2% by mass or more and 15% by mass or less relative to the total mass of the textile printing ink jet ink composition.

In the textile printing ink jet ink composition set according to the invention, the textile printing ink jet ink composition having a hue angle ∠h° within a range of 260° or more and 310° or less and a chroma C* of 45 or less, which are specified in the CIELAB color space, on a textile printing product after textile printing may contain a dye having a maximum absorption wavelength within a range of 550 nm or more and 600 nm or less.

In the textile printing ink jet ink composition set according to the invention, the textile printing ink jet ink composition having a hue angle ∠h° within a range of 15° or more and 80° or less and a chroma C* of 65 or less, which are specified in the CIELAB color space, on a textile printing product after textile printing may contain a dye having a maximum absorption wavelength within a range of 350 nm or more and 450 nm or less.

In the textile printing ink jet ink composition set according to the invention, the textile printing ink jet ink composition having a hue angle ∠h° within a range of 260° or more and 310° or less and a chroma C* of 45 or less, which are specified in the CIELAB color space, on a textile printing product after textile printing may contain one or more dyes selected from C.I. Reactive Blue 13 and C.I. Acid Blue 193; and the textile printing ink jet ink composition having a hue angle ∠h° within a range of 15° or more and 80° or less and a chroma C* of 65 or less, which are specified in the CIELAB color space, on a textile printing product after textile printing may contain one or more dyes selected from C.I. Reactive Orange 35, C.I. Reactive Orange 12, C.I. Reactive Orange 99, and C.I. Acid Brown 298.

In the textile printing ink jet ink composition set according to the invention, the textile printing ink jet ink composition having a hue angle ∠h° within a range of 260° or more and 310° or less and a chroma C* of 45 or less, which are specified in the CIELAB color space, on a textile printing product after textile printing may contain a chromium-containing dye; and the textile printing ink jet ink composition having a hue angle ∠h° within a range of 15° or more and 80° or less and a chroma C* of 65 or less, which are specified in the CIELAB color space, on a textile printing product after textile printing may contain a chromium-containing dye.

In the textile printing ink jet ink composition set according to the invention, the textile printing ink jet ink composition having a hue angle ∠h° within a range of 260° or more and 310° or less and a chroma C* of 45 or less, which are specified in the CIELAB color space, on a textile printing product after textile printing may contain a copper-containing dye; and the textile printing ink jet ink composition having a hue angle ∠h° within a range of 15° or more and 80° or less and a chroma C* of 65 or less, which are specified in the CIELAB color space, on a textile printing product after textile printing may contain a metal-free dye.

In the textile printing ink jet ink composition set according to the invention, either or both of the following compositions may contain 3% by mass or more and 30% by mass or less of a cyclic amide, which is liquid at room temperature and has a normal boiling point of 190° C. or more and 260° C. or less, relative to the total mass of the textile printing ink jet ink compositions: the textile printing ink jet ink composition having a hue angle ∠h° within a range of 260° or more and 310° or less and a chroma C* of 45 or less, which are specified in the CIELAB color space, on a textile printing product after textile printing; and the textile printing ink jet ink composition having a hue angle ∠h° within a range of 15° or more and 80° or less and a chroma C* of 65 or less, which are specified in the CIELAB color space, on a textile printing product after textile printing.

In the textile printing ink jet ink composition set according to the invention, either or both of the following compositions may contain 10% by mass or more and 25% by mass or less of an alkyl polyol, which has a normal boiling point of 180° C. or more and 260° C. or less, relative to the total mass of the textile printing ink jet ink compositions: the textile printing ink jet ink composition having a hue angle ∠h° within a range of 260° or more and 310° or less and a chroma C* of 45 or less, which are specified in the CIELAB color space, on a textile printing product after textile printing; and the textile printing ink jet ink composition having a hue angle ∠h° within a range of 15° or more and 80° or less and a chroma C* of 65 or less, which are specified in the CIELAB color space, on a textile printing product after textile printing.

In the textile printing ink jet ink composition set according to the invention, either or both of the following compositions may not contain benzotriazole: the textile printing ink jet ink composition having a hue angle ∠h° within a range of 260° or more and 310° or less and a chroma C* of 45 or less, which are specified in the CIELAB color space, on a textile printing product after textile printing; and the textile printing ink jet ink composition having a hue angle ∠h° within a range of 15° or more and 80° or less and a chroma C* of 65 or less, which are specified in the CIELAB color space, on a textile printing product after textile printing.

In the textile printing ink jet ink composition set according to the invention, either or both of the following compositions may contain 3% by mass or more and 15% by mass or less of glycol ether relative to the total mass of the textile printing ink jet ink compositions: the textile printing ink jet ink composition having a hue angle ∠h° within a range of 260° or more and 310° or less and a chroma C* of 45 or less, which are specified in the CIELAB color space, on a textile printing product after textile printing; and the textile printing ink jet ink composition having a hue angle ∠h° within a range of 15° or more and 80° or less and a chroma C* of 65 or less, which are specified in the CIELAB color space, on a textile printing product after textile printing.

According to an aspect of the invention, a textile printing ink jet ink composition set includes a textile printing ink jet ink composition containing a dye having a maximum absorption wavelength within a range of 550 nm or more and 600 nm or less, and a textile printing ink jet ink composition containing a dye having a maximum absorption wavelength within a range of 350 nm or more and 450 nm or less.

In the textile printing ink jet ink composition set according to the invention, the dye having a maximum absorption wavelength within a range of 550 nm or more and 600 nm or less is one or more dyes selected from C.I. Reactive Blue 13 and C.I. Acid Blue 193; and the dye having a maximum absorption wavelength within a range of 350 nm or more and 450 nm or less is one or more dyes selected from C.I. Reactive Orange 35, C.I. Reactive Orange 12, C.I. Reactive Orange 99, and C.I. Acid Brown 298.

A recording method according to an aspect of the invention includes ejecting and adhering, by an ink jet method, the textile printing ink jet ink composition set to a fabric containing one or more agents selected from a sizing agent, an alkali agent, an acid, and a hydrotropic agent.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
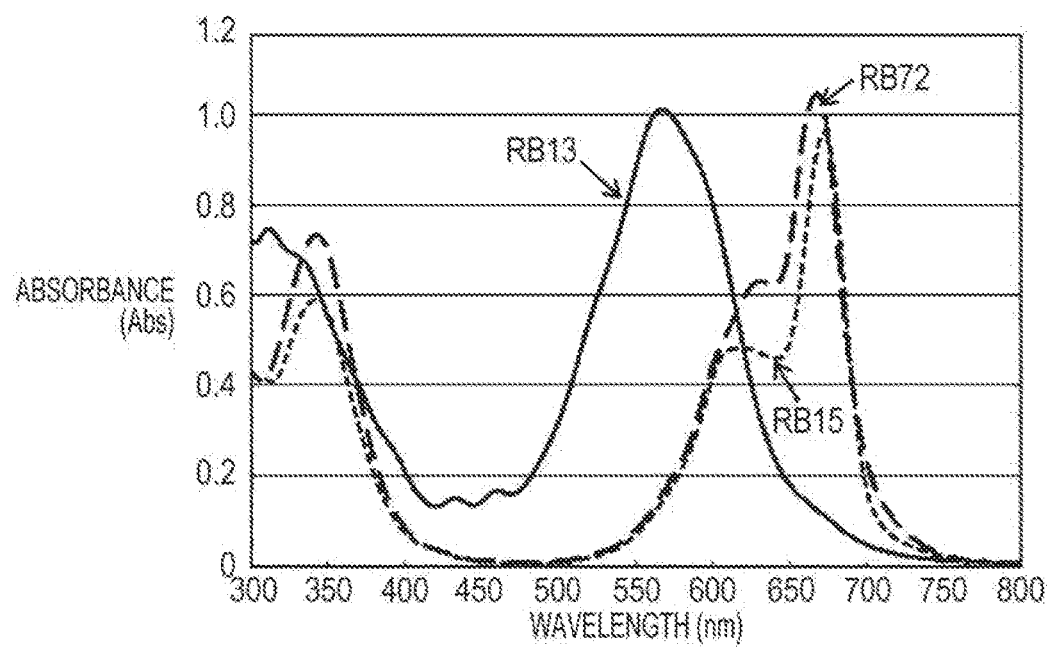
FIG. 1 is a graph showing the visible region absorption spectra of C.I. Reactive Blue 13 (RB13), C.I. Reactive Blue 15 (RB15), and C.I. Reactive Blue 72 (RB72).

Some embodiments of the invention are described below. In the description of the embodiments below, an example of the invention is described. The invention is not limited to the embodiments and includes various modifications carried out within a range in which the gist of the invention is not changed. In addition, all the configurations described below are not necessarily essential configurations of the invention.

1. TEXTILE PRINTING INK JET INK COMPOSITION SET

A textile printing ink jet ink composition set according to an embodiment of the invention includes a textile printing ink jet ink composition having a hue angle $\angle h°$ within a range of 260° or more and 310° or less and a chroma $C^*$ of 45 or less, which are specified in the CIELAB color space, on a textile printing product after textile printing; and a textile printing ink jet ink composition having a hue angle $\angle h°$ within a range of 15° or more and 80° or less and a chroma $C^*$ of 65 or less, which are specified in the CIELAB color space, on a textile printing product after textile printing.

Regarding Hue Angle $\angle h°$ and Chroma $C^*$

The hue angle $\angle h°$ specified in the CIELAB color space is a parameter indicating a hue and calculated by a formula below using color coordinates $a^*$ and $b^*$ in the $L^*a^*b^*$ color space, which is a color space having perceptually nearly uniform steps and recommended by the International Commission on Illumination (CIE) in 1976. The hue angle $\angle h°$ is represented by "hue angle $\angle h°=\tan^{-1}(b^*/a^*)$". The chroma $C^*$ is represented by "chroma $C^*=[(a^*)^2+(b^*)^2]^{1/2}$".

The hue angle $\angle h°$ and chroma $C^*$ are the hue-correlated amounts (also refer to 03086 and 03087 of JIS Z8113) calculated by the formula (11) in "4.2 Correlates of brightness, chroma, and hue" in "3.6 CIELAB 1976 ab hue angle" and "3.5 CIELAB 1976 Chroma $C^*$" of Japanese Industrial Standard JISZ8781-4:2013 "Colorimetry-Part 4: CIE 1976 $L^*a^*b^*$ Color Space". "CIE 1976 $L^*a^*b^*$" and "CIELAB" can be replaced by each other.

The hue angle $\angle h°$ and chroma $C^*$ specified in the CIELAB color space "on a textile printing product after textile printing" of the textile printing ink jet ink composition specified in the specification of the invention can be determined by, for example, measurement according to "5. Spectrophotometric colorimetry" of JIS Z8722:2009 "Method of color measurement-Reflecting and transmitting objects" by Japanese Industrial Standard. The measurement conditions are as follows.

(1) A textile printing ink jet ink composition is formed.

(2) An ink is applied to a pre-treated fabric used as a textile printing object.

(3) Sufficient reaction is performed by heating, streaming, or the like.

(4) The fabric is washed.

(5) Spectrophotometric colorimetry is performed.

Then, from the measurement results, the hue angle $\angle h°$ and chroma $C^*$ are calculated as the hue angle $\angle h°$ and chroma $C^*$, which are specified in the CIELAB color space, of the textile printing ink jet ink composition "on a recording medium".

More specifically, the hue angle $\angle h°$ and chroma $C^*$, which are specified in the CIELAB color space, on a textile printing product after textile printing specified in the specification of the invention are the values obtained by measurement by the following test method.

Test Method

A fabric with a lightness $L^*$ of 90 (cotton 100% for a reactive ink and a PA elastomer for an acid ink) is used, and <Pretreatment solution for reactive ink> or <Pretreatment solution for acid ink> described below used as a pretreatment composition is applied to the fabric. Then, the fabric is dried by squeezing with a mangle with a pickup rate of 80%. Then, a cartridge of an ink jet printer PX-G930 (manufactured by Seiko Epson Corporation) is filled with an ink, and the ink is adhered to the pre-treated fabric with a resolution of 1440 dpi×720 dpi under the condition of an ink ejection amount of 23 mg/inch$^2$, forming an image.

Next, the fabric on which the image has been formed is steamed at 102° C. for 10 minutes, then washed with an aqueous solution containing 0.2% by mass of Laccol STA (surfactant manufactured by Meisei Chemical Works, Ltd.) at 90° C. for 10 minutes, and dried to form each evaluation sample.

The hue angle $\angle h°$ and the chroma $C^*$ of the resultant evaluation sample are calculated from the $a^*$ and $b^*$ values determined by using a colorimeter (trade name "Spectrolino", manufactured by X-RITE, Inc., measurement conditions: light source D65, filter D65, φ2 degrees). Similarly, the lightness $L^*$ of each fabric is measured by using a colorimeter (trade name "Spectrolino", manufactured by X-RITE, Inc., measurement conditions: light source D65, filter D65, φ2 degrees).

Pretreatment Solution for Reactive Ink

First, 5 parts by mass of polyoxyethylene diisopropyl ether (oxyethylene=30 moles), 5 parts by mass of etherified carboxymethyl cellulose, 100 parts by mass of urea (hydrotropic agent), and 10 parts by mass of sodium m-nitrobenzenesulfonate are sufficiently mixed. Then, the resultant mixture is stirred at 60° C. for 30 minutes while being added little by little to 1000 parts by mass of ion exchange water. Then, 30 parts by mass of sodium carbonate (alkali agent) is further added to the solution under stirring and further stirred for 10 minutes. The resultant solution is filtered with a membrane filter having a pore size of 10 μm, thereby preparing a pretreatment solution.

Pretreatment Solution for Acid Ink

A pretreatment solution is prepared by the same method as for preparation of the pretreatment solution for a reactive ink except that sodium m-nitrobenzenesulfonate is not added, and ammonium sulfate is used in place of sodium carbonate as an alkali agent.

1.1. Textile Printing Ink Jet Ink Composition Having a Hue Angle ∠h° Within a Range of 260° or More and 310° or Less and a Chroma C* of 45 or Less The textile printing ink jet ink composition (may be referred to as the "navy blue composition" hereinafter") having a hue angle ∠h° within a range of 260° or more and 310° or less and a chroma C* of 45 or less can develop, on the textile printing product after textile printing, colors named "dark blue", "navy blue" (Japanese Industrial Standard JIS custom color name), "deep blue", "prussian blue", "blue", "indigo blue", "ultramarine blue", "lapis lazuli blue", and the like. Also, the navy blue composition can develop colors with a chroma C* of 45 or less on the textile printing product after textile printing. The chroma C* represents the distance from the origin in the a* and b* coordinates specified in the CIELAB space, and a color having a chroma C* of 45 or less is close to an achromatic color, that is, a color making a chic impression.

1.1.1. Component

The dye contained in the navy blue composition is not limited as long as it has a hue angle ∠h° of 260° or more and 310° or less and a chroma C* of 45 or less, which are specified in the CIELAB color space, on the textile printing product after textile printing. However, the navy blue composition preferably contains one or more dyes selected from a chromium-containing dye and a copper-containing dye.

1.1.1.1. Dye

The dye contained in the navy blue composition according to the embodiment preferably contains chromium (Cr) or copper (Cu) in its structure and preferably contains either or both of the chromium-containing dye and the copper-containing dye. The dye containing chromium or copper is, for example, a dye containing one or more chromium atoms or copper atoms in its molecular structure, and examples thereof include compounds each containing the structure of a chromium complex, a chromium complex salt, a copper complex, a copper complex salt, or the like in its molecule. Examples of these dyes include, but are not limited to, a dye having a phthalocyanine ring skeleton, a dye having a functional group which can be coordinate-bonded to a chromium or copper atom, and the like.

In the case of the navy blue composition, C.I. Acid Blue 193 and the like are specifically exemplified as the chromium-containing dye which can easily have a hue angle ∠h° within a range of 260° or more and 310° or less, which are specified in the CIELAB color space, on the textile printing product after textile printing.

The chemical structure of C.I. Acid Blue 193 is represented by formula (1) below. In the specification of the invention, a group represented by a salt form, such as "—SO$_3$Na" or the like, in a chemical formula represents the case where a counter ion of "—SO$_3$—" or the like is "Na$^+$". However, counter ions of groups of "—SO$_3$—" or the like in formulae may be independently "H$^+$", "Li$^+$", "K$^+$", or the like.

C.I. Acid Blue 193: Formula (1)

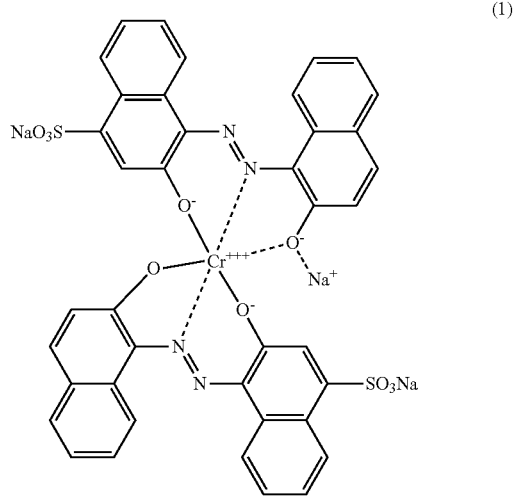

(1)

In the case of the navy blue composition, examples of the copper-containing dye which can easily have a hue angle ∠h° within a range of 260° or more and 310° or less, which are specified in the CIELAB color space, on a recording medium include C.I. Reactive Blue 13, C.I. Reactive Blue 15, C.I. Reactive Blue 72, C.I. Direct Blue 87, and the like. In particular, when the textile printing ink jet ink composition contains C.I. Reactive Blue 13 alone, the dye can easily have a hue angle ∠h° within a range of 260° or more and 310° or less, which are specified in the CIELAB color space, on the recording medium.

The chemical structures of C.I. Reactive Blue 13, C.I. Reactive Blue 15, C.I. Reactive Blue 72, and C.I. Direct Blue 87 are represented by formula (2), formula (3), formula (4), and formula (5) below, respectively.

C.I. Reactive Blue 13: Formula (2)

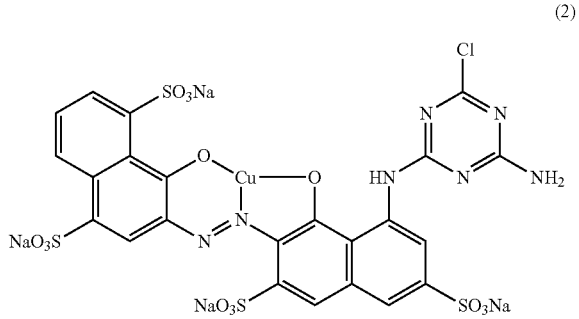

(2)

-continued

C.I. Reactive Blue 15: Formula (3)

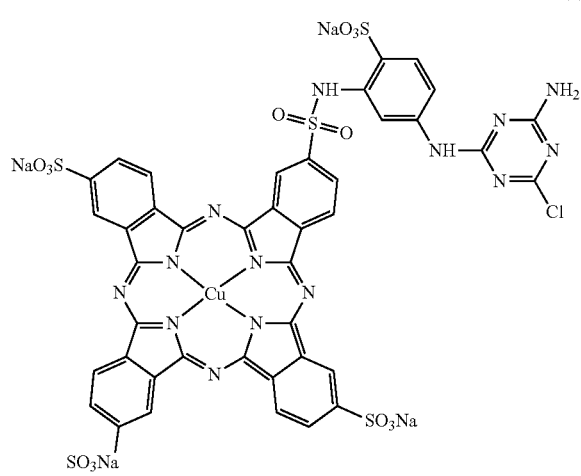

C.I. Reactive Blue 72: Formula (4)

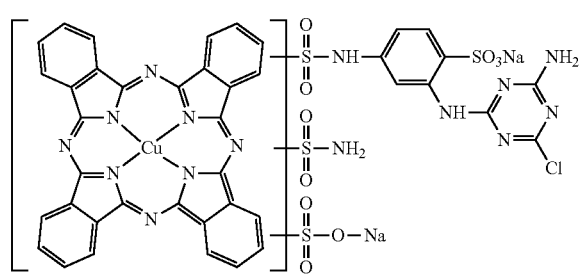

The three functional groups (—SO$_2$—) in the formula (4) are bonded to any outer rings of a heterocycle (phthalocyanine ring), and thus C.I. Reactive Blue 72 is a mixture of a plurality of compounds.

C.I. Direct Blue 87: Formula (5)

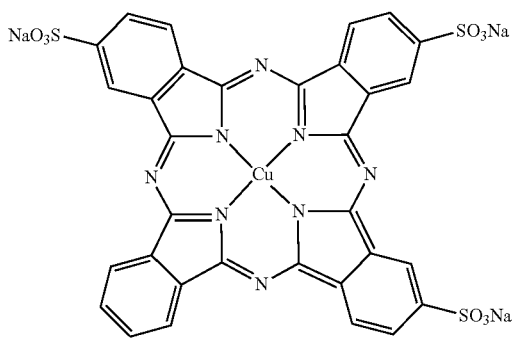

When the dye contains chromium or copper, the textile printing product can be imparted with good color development and hue stability with time (light resistance).

On the other hand, even when the dye in the navy blue composition can have a hue angle ∠h° within a range of 260° or more and 310° or less, which are specified in the CIELAB color space, on the textile printing product, if the dye contain neither chromium nor copper, the color development and hue stability (light resistance) of the textile printing product are not necessarily satisfactory.

Examples of the dye which contain neither chromium nor copper and can easily have a hue angle ∠h° within a range of 260° or more and 310° or less, which are specified in the CIELAB color space, include C.I. Reactive Blue 49 and C.I. Acid Blue 112. The chemical structures thereof are represented by formula (6) and (7) below, respectively.

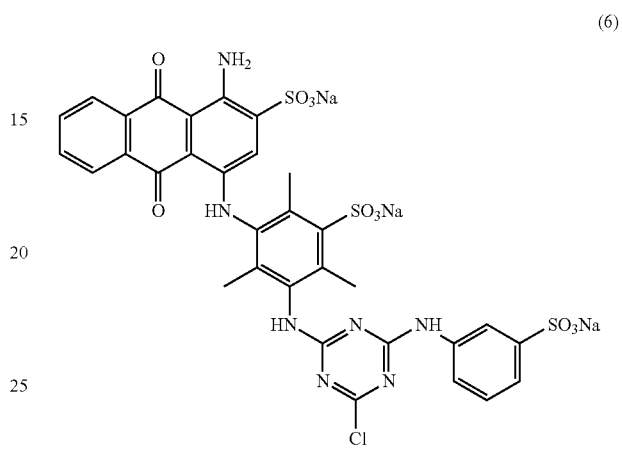

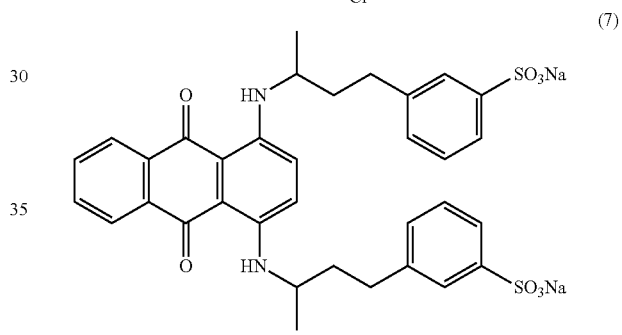

1.1.1.2 Cyclic Amide

The navy blue composition of the embodiment contains a cyclic amide which is liquid at room temperature and has a normal boiling point of 190° C. or more and 260° C. or less. The cyclic amide has the function of facilitating the dissolution of the dyes described above and suppressing solidification and drying of the navy blue composition. Also, with the normal boiling point of 190° C. or more and 260° C. or less, evaporation of the cyclic amide is sufficiently suppressed, and accordingly the moisturizing property is enhanced. As a result, the effect of suppressing solidification and drying of the navy blue composition can be more significantly exhibited.

The cyclic amide is, for example, a compound having a cyclic structure containing an amide group, and examples thereof include compounds represented by formula (8) below.

Formula (8)

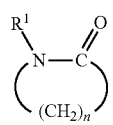

In the formula (8), $R^1$ represents hydrogen or an alkyl group having 1 to 4 carbon atoms, n represents an integer of 1 to 4, and the alkyl group may be linear or branched.

Examples of the compounds represented by the formula (8) include γ-lactams, β-lactams, δ-lactams, and the like, such as 2-pyrrolidone [245° C.], 1-methyl-pyrrolidone [204° C.] (N-methyl-2-pyrrolidone), 1-ethyl-2-pyrrolidone [212° C.] (N-ethyl-2-pyrrolidone), N-vinyl-2-pyrrolidone [193° C.], 1-propyl-2-pyrrolidone, 1-buty-2-pyrrolidone, and the like. The numerical values in brackets show the normal boiling points. These cyclic amides may be used alone or in combination of two or more.

Examples of a compound which is liquid at room temperature among cyclic amide compounds include 2-pyrrolidone (25° C.), 1-methyl-2-pyrrolidone (−24° C.), 1-ethyl-2-pyrrolidone (−77° C.), N-vinyl-2-pyrrolidone (14° C.), and the like. The numerical values in parentheses indicate the melting points. In addition, 2-pyrrolidone has a melting point of as high as 25° C., and when purchased, the reagent may be solid at room temperature (for example, 23° C., 25° C., or the like). However, when the reagent is once melted by, for example, heating with hot water of about 40° C., the liquid state can be kept at room temperature. The inventors suppose that this phenomenon is caused by an overcooled state or freezing point depression due to water or the like, but in the invention, the expression "liquid at room temperature" includes such a state.

The total content of the cyclic amide relative to the total mass of the ink composition is 1% by mass or more and 30% by mass or less, preferably 3% by mass or more and 30% by mass or less, more preferably 5% by mass or more and 25% by mass or less, and still more preferably 7% by mass or more and 15% by mass or less.

With the total content of the cyclic amide within the range, the dye can be sufficiently dissolved, and for example, the mixing amount (concentration) of the dye containing chromium or copper can be increased. That is, among the dyes containing chromium or copper, when a specified dye (for example, C.I. Reactive Blue 13, C.I. Reactive Blue 15, C.I. Reactive Blue 72, or C.I. Acid Blue 193, particularly at least one of C.I. Reactive Blue 13 and C.I. Acid Blue 193) is used for the navy blue composition, it is relatively difficult to increase the color development by increasing the concentration because solubility is not necessarily high. However, the mixing amount of the dye containing chromium or copper can be increased by using the cyclic amide, resulting in further improvement in the color development of the textile printing product.

1.1.1.3. Other Components

The navy blue composition of the embodiment can contain the following components other than the components described above.

Alkyl Polyol

The navy blue composition of the embodiment may contain an alkyl polyol having a normal boiling point of 180° C. or more and 260° C. or less. Containing the alkyl polyol can further enhance the moisturizing property of the navy blue composition and effectively suppress the evaporation of water from a recording head during long-term storage while improving ejection stability by an ink jet method. Therefore, even when a dye of a type which easily causes clogging of a nozzle is used, recovery from standing and continuous ejection stability can be kept good.

Examples of the alkyl polyol having a normal boiling point of 180° C. or more and 260° C. or less include 1,2-butanediol [194° C.], 1,2-pentanediol [210° C.], 1,2-hexanediol [224° C.], 1,2-heptanediol [227° C.], 1,3-propanediol [210° C.], 1,3-butanediol [230° C.], 1,4-butanediol [230° C.], 1,5-pentanediol [242° C.], 1,6-hexanediol [250° C.], 2-ethyl-2-methyl-1,3-propanediol [226° C.], 2-methyl-2-propyl-1,3-propanediol [230° C.], 2-methyl-1,3-propanediol [214° C.], 2,2-dimethyl-1,3-propanediol [210° C.], 3-methyl-1,3-butanediol [203° C.], 2-ethyl-1,3-hexanediol [244° C.], 3-methyl-1,5-pentanediol [250° C.], 2-methyl-pentane-2,4-diol [197° C.], diethylene glycol [245° C.], dipropylene glycol [232° C.], and the like. The numerical values in brackets show the normal boiling points. These alkyl polyols may be used alone or in combination of two or more.

When the content of the alkyl polyol having a normal boiling point of 180° C. or more and 260° C. or less is 5% by mass or more relative to the total mass of the navy blue composition, the effect can be exhibited. However, the content is preferably 5% by mass or more and 30% by mass or less, more preferably 8% by mass or more and 27% by mass or less, and still more preferably 10% by mass or more and 25% by mass or less.

The navy blue composition of the embodiment preferably does not contain an alkyl polyol having a normal boiling point of 260° C. or more. This is because the alkyl polyol having a normal boiling point of 260° C. or more inhibits the dyeability of the dye and easily causes a decrease in color reproducibility and color development of an image. Examples of the alkyl polyol having a normal boiling point of 260° C. or more include triethylene glycol [287° C.], glycerin [290° C.], and the like.

In the specification, the description "does not contain", for example, "does not contain A", represents not only that A is not at all contained, but also that A is not intentionally added for producing a composition, and a trace amount of A may be contained, which is inevitably mixed or produced during the production or storage of the composition. For example, the description "does not contain" represents "does not contain 1.0% by mass or more", "preferably does not contain 0.5% by mass or more", "more preferably does not contain 0.1% by mass or more", "still more preferably does not contain 0.05% by mass or more, and "particularly preferably does not contain 0.01% by mass or more".

The description "does not contain an alkyl polyol having a normal boiling point of 260° C. or more" represents "does not contain 1.0% by mass or more", "preferably does not contain 0.5% by mass or more", "more preferably does not contain 0.1% by mass or more", "still more preferably does not contain 0.05% by mass or more", and "particularly preferably does not contain 0.01% by mass or more". Also, the description "does not contain a compound having a benzotriazole skeleton" below represents "preferably does not contain 0.05% by mass or more", "more preferably does not contain 0.02% by mass or more", and "still more preferably does not contain 0.005% by mass or more".

Surfactant

The navy blue composition according to the embodiment may contain a surfactant. The surfactant can be used for decreasing the surface tension of the navy blue composition in order to adjust and improve wettability (permeability into the fabric or the like) to a recording medium. Any one of a nonionic surfactant, an anionic surfactant, a cationic surfactant, and an amphoteric surfactant can be used as the surfactant, and these may be used in combination. Among the surfactants, an acetylene glycol-based surfactant, a silicone-based surfactant, and a fluorine-based surfactant can be preferably used.

Examples of the acetylene glycol-based surfactant include, but are not particularly limited to, Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all the above are trade names, manufactured by Air Products and Chemicals, Inc.), Olfine B, Y, P, A, STG, SPC, E1004, E1010, PD-001, PD-002W, PD-003, PD-004, PD-005, EXP.4001, EXP.4036, EXP.4051, AF-103, AF-104, AK-02, SK-14, and AE-3 (all the above are trade names, manufactured by Nissin Chemical Industry Co., Ltd.), and Acetylenol E00, E00P, E40, and E100 (all the above are trade names, manufactured by Kawaken Fine Chemicals Co., Ltd.).

The silicone-based surfactant is not particularly limited, but a polysiloxane-based compound can be preferably used. Examples of the polysiloxane-based compound include, but are not particularly limited to, polyether-modified organosiloxanes. Examples of commercial products of the polyether-modified organosiloxanes include BYK-306, BYK-307, BYK-333, BYK-341, BYK-345, BYK-346, and BYK-348 (the above are trade names, manufactured by BYK Co., Ltd.), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are trade names, manufactured by Shin-Etsu Chemical Co., Ltd.).

A fluorine-modified polymer is preferably used as the fluorine-based surfactant, and examples thereof include BYK-340 (BYK Chemie Japan, Inc.).

When the navy blue composition is mixed with the surfactant, the total content of the surfactant relative to the whole of the navy blue composition is 0.01% by mass or more and 3% by mass or less, preferably 0.05% by mass or more and 2% by mass or less, more preferably 0.1% by mass or more and 1.5% by mass or less, and particularly preferably 0.2% by mass or more and 1% by mass or less.

When the navy blue composition contains the surfactant, stability during ink ejection from a head tends to be increased. Also, the use of a proper amount of the surfactant may improve the permeability into the fabric and thus increase the contact with a pretreatment composition.

pH Adjuster

For the purpose of adjusting pH, a pH adjuster can be added to the navy blue composition of the embodiment. The pH adjuster is not particularly limited, but a proper combination of an acid, a base, a weak acid, and a weak base can be used. Examples of the acid and base used in such a combination include inorganic acids such as sulfuric acid, hydrochloric acid, nitric acid, and the like; inorganic bases such as lithium hydroxide, sodium hydroxide, potassium hydroxide, potassium dihydrogen phosphate, disodium hydrogen phosphate, potassium carbonate, sodium carbonate, sodium hydrogen carbonate, ammonia, and the like; organic bases such as triethanolamine, diethanolamine, monoethanolamine, tripropanolamine, triisopropanolamine, diisopropanolamine, trishydroxymethyl aminomethane (THAM), and the like; organic acids such as adipic acid, citric acid, succinic acid, lactic acid, N,N-bis(2-hydroxyethyl)-2-aminoethanesulfonic acid (BES), 4-(2-hydroxyethyl)-1-pyperazine ethanesulfonic acid (HEPES), morpholinoethanesulfonic acid (MES), carbamoylmethyl iminobisacetic acid (ADA), piperazine-1,4-bis(2-ethanesulfonic acid) (PIPES), N-(2-acetamido)-2-aminoethanesulfonic acid (ACES), cholamine chloride, N-tris(hydroxymethyl)methyl-2-aminoethanesulfonic acid (TES), actamidoglycine, tricine, glycinamide, good buffers such as bicine and the like, a phosphate buffer, a citrate buffer, a tris buffer, and the like. Among these, a tertiary amine such as triethanolamine, triisopropanolamine, or the like, and a carboxyl group-containing organic acid such as adipic acid, citric acid, succinic acid, lactic acid, or the like is preferably contained as a portion or whole of the pH adjuster because a pH buffer effect can be more stably obtained.

Water

The navy blue composition according to the embodiment may contain water. Examples of water include pure water such as ion exchange water, ultrafiltered water, reverse osmosis water, distilled water, and the like, and ultrapure water from which ionic impurities are removed as much as possible. In addition, when water sterilized by ultraviolet irradiation or adding hydrogen peroxide is used, the occurrence of bacteria and fungi can be suppressed in the case of long-term storage of the navy blue composition.

The content of water relative to the total amount of the navy blue composition is 30% by mass or more, preferably 40% by mass or more, more preferably 45% by mass or more, and still more preferably 50% by mass or more. The term "water in the navy blue composition" includes, for example, the water added to a resin particle dispersion used as a raw material. With the water content of 30% by mass or more, the viscosity of the navy blue composition can be made relatively low. The upper limit of the water content relative to the total amount of the navy blue composition is preferably 90% by mass or less, more preferably 85% by mass or less, and still more preferably 80% by mass or less.

Organic Solvent

The navy blue composition of the embodiment may contain a cyclic amide having a normal boiling point of less than 190° C. or over 260° C., a nitrogen-containing hetrocyclic compound, and a water-soluble organic solvent. Examples of the cyclic amide having a normal boiling point of less than 190° C. or over 260° C. include lactams such as ε-caprolactam [136° C.] and the like; and examples of the water-soluble organic solvent include lactones such as γ-butyrolactone [204° C.] and the like, betaine compounds, and the like. Further, glycol ether may be contained, which may further control the wettability and permeation rate of the composition and thus improve the color development of an image.

The glycol ether having a normal boiling point of 190° C. or more and 260° C. or less is preferably a monoalkyl ether of glycol selected from ethylene glycol, diethylene glycol, triethylene glycol, polyethylene glycol, propylene glycol, dipropylene glycol, tripropylene glycol, polypropylene glycol, and polyoxyethylene polyoxypropylene glycol. More preferred are methyl triglycol (triethylene glycol monomethyl ether), butyl triglycol (triethylene glycol monobutyl ether), butyl diglycol (diethylene glycol monobutyl ether), dipropylene glycol monopropyl ether, and the like. A typical example is diethylene glycol monobutyl ether [230° C.]. The numerical value in brackets indicates the normal boiling point.

These organic solvents may be used in combination of a plurality of types. In addition, from the viewpoint of adjusting the viscosity of the navy blue composition and preventing clogging by the moisturizing effect, the mixing amount of the organic solvent described in this item relative to the total amount of the navy blue composition is 0.2% by mass or more and 30% by mass or less, preferably 0.4% by mass or more and 20% by mass or less, more preferably 0.5% by mass or more and 15% by mass or less, and still more preferably 0.7% by mass or more 10% by mass or less.

Ureas

Urea may be used as a moisturizing agent of the navy blue composition or a dyeing auxiliary for improving dyeability of a dye. Examples of ureas include urea, ethylene urea, tetramethyl urea, thiourea, 1,3-dimethyl-2-imidazolidinone, and the like. When the urea is contained, the content thereof is 1% by mass or more and 10% by mass or less relative to the total mass of the ink composition.

Saccharides

A saccharide may be used for the purpose of suppressing solidification and drying of the navy blue composition. Examples of the saccharide include glucose, mannose, fructose, ribose, xylose, arabinose, galactose, aldonic acid, glucitol (sorbit), maltose, cellobiose, lactose, sucrose, trehalose, maltotriose, and the like.

Chelating Agent

A chelating agent may be used for the purpose of removing unnecessary ions in the navy blue composition. Examples of the chelating agent include ethylenediamine tetraacetic acid and salts thereof (disodium dihydrogen ethylenediamine tetraacetate, ethylenediamine nitrilotriacetic acid salts, hexametaphosphoric acid salts, pyrophosphoric acid salts, and metaphosphoric acid salts, and the like), and the like.

Preservative and Fungicide

The navy blue composition may use a preservative and a fungicide. Examples of the preservative and fungicide include sodium benzoate, pentachlorophenol sodium, 2-pyridinethiol-1-oxide sodium, sodium sorbate, sodium dehydroacetate, 1,2-dibenzoisothiazolin-3-one (Zeneca Inc. Proxel CRL, Proxel BDN, Proxel GXL, Proxel XL2, Proxel TN, and Proxel LV), 4-chloro-3-methylphenol (Bayer Corporation Preventol CMK and the like), and the like.

Others

Components other than the above components may be contained, and examples of the other components include additives which can be generally used for an ink composition for ink jet, such as an anti-rust agent, an antioxidant, an ultraviolet absorber, an oxygen absorber, a solubilizer, and the like.

When the navy blue composition of the embodiment contains a dye containing chromium or copper, chromium or copper may separate from the chemical structure of the dye. That is, free chromium or copper (including ions thereof) may be produced in the navy blue composition. Even when free chromium or copper is produced in the navy blue composition, changes in hue and in color development are relatively small, and from this viewpoint, a significant problem hardly occurs. In addition, for example, in a case containing the chelating agent, a complex is consequently formed, thereby solubilizing chromium or copper. Thus, for example, a defect of precipitation and adhesion of chromium or copper in a flow passage can be sufficiently suppressed.

However, in the case containing the copper-containing dye and the anti-rust agent having a specific molecular structure, when the molecule of the anti-rust agent forms a complex with copper, a structure with high planarity may be formed. The investigation conducted by the inventors of the invention has revealed that the complex with high planarity is easily precipitated because stacking and packing is more energetically advantageous than solvation (hydration).

C.I. Reactive Blue 13 exemplified as the dye which can be used in the navy blue composition of the embodiment has a smaller number of coordinate bonds to copper than those of C.I. Reactive Blue 15 and C.I. Reactive Blue 72, and thus copper is considered to more easily separate. Therefore, particularly when C.I. Reactive Blue 13 is used, foreign materials derived from the dye are considered to be more easily produced in coexistence with the anti-rust agent having a specific molecular structure.

The investigation conducted by the inventors of the invention based on the above viewpoint has revealed that a compound having a structure with high planarity when forming a complex with copper has a benzotriazole skeleton. The compound having a benzotriazole skeleton is often used as, for example, the anti-rust agent for protecting a metal member containing SUS or copper in an ink jet recording apparatus. However, it is considered that when the compound is used in combination with the copper-containing dye, foreign materials and nozzle clogging and ejection defect accompanied therewith more easily occur.

For this reason, when the navy blue composition of the embodiment contains the copper-containing dye, the composition more preferably does not contain the compound having a benzotriazole skeleton. Examples of the compound having a benzotriazole skeleton include 1,2,3-bezotriazole (including tautomers), carboxybenzotriazole (having one or more carboxyl groups bonded to any benzene ring part), salts of 1,2,3-benzotriazole (containing sodium, potassium, lithium, or the like as counter ion), hydroxybenzotriazole (including hydrate), and the like. Examples of commercial products of the compounds include trade names: BT-120, CBT-1, JCL-400, and the like manufactured by Johoku Chemical Co., Ltd., and other commercial reagents.

1.1.2. Adjustment of Hue Angle $\angle h°$ and Chroma $C^*$

Examples of a method for adjusting the hue angle $\angle h°$ specified in the CIELAB color space to fall within a range of 260° or more and 310° or less on a recording medium include some methods such as changing the dye, mixing with a dye having a different hue angle, and the like. More specific examples of the method include a method of modifying a conjugated system by changing the number and types of aromatic rings and substituents of a specified dye, a method of changing a center metal, a method of mixing with another dye, and the like.

However, among these methods, when the hue angle is adjusted by the method of mixing the navy blue composition with another dye, the other dye is preferably mixed in a smaller amount. For example, the total relative to the whole of the navy blue composition is 1% by mass or less, preferably 0.5% by mass or less, more preferably 0.3% by mass or less, still more preferably 0.1% by mass or less, and particularly preferably 0.05% by mass or less. In this case, even when discoloration of each of the dyes occurs with time, a change in hue angle of a textile printing portion can be suppressed to be small. In addition, when another dye is mixed, the hue angles of the dyes used are more preferably close to each other. In this case, the mixing amount may be increased, and the total relative to the whole of the navy blue composition is 2% by mass or less, preferably 1% by mass or less, more preferably 0.5% by mass or less, still more preferably 0.3% by mass or less, and particularly preferably 0.1% by mass or less.

A mixture of a plurality of types of chromium- or copper-containing dyes can be used. However, from the viewpoint that a change in hue angle of a textile printing portion is suppressed to be small, a single type is preferably mixed. When the chromium- or copper-containing dye is used as the other dye, the other dye can be mixed the mixing amount according to the hue angle of the other chromium- or copper-containing dye.

Also, the navy blue composition of the embodiment preferably uses only the chromium- or copper-containing dye which is more preferably singly used. In this case, a dye containing neither chromium nor copper may be contained at a level at which the dye can be regarded as an impurity. That is, the total of the dye regarded as an impurity relative to the whole of the dyes contained in the navy blue composition is 1% by mass or less, preferably 0.1% by mass or less, more preferably 0.01% by mass or less, still more preferably 0.001% by mass or less, and particularly preferably 0.0001% by mass or less. This is more preferred because textile printing can be performed by using substantially only the chromium- or copper-containing dye, and thus, even when discoloration with time of the dye occurs, substantially no change in hue angle occurs in the textile printing portion.

Examples of a method for adjusting the chroma C* to fall within a range of 45 or less include some methods such as changing the dye, mixing with a black dye, and the like. Like the other dye, the black dye is preferably used in a small amount.

The total content of the chromium- or copper-containing dye in the navy blue composition of the embodiment relative to the total mass of the textile printing ink jet ink composition is 2% by mass or more and 30% by mass or less, preferably 3% by mass or more and 15% by mass or less, and more preferably 4% by mass or more and 10% by mass or less.

Further, the dye mixed in the textile printing ink jet ink composition of the embodiment is more preferably one or more dyes selected from C.I. Reactive blue 13 and C.I. Acid Blue 193. By selecting such a dye, a color having a hue angle ∠h° within a range of 260° or more and 310° or less and a chroma C* within a range of 45 or less can be expressed with good color development on the textile printing product without mixing a plurality of colors, and a change in hue with time (light resistance) can be suppressed. That is, good color development on the textile printing product can be achieved by containing at least the chromium- or copper-containing dye. Further, when C.I. Reactive Blue 13 or C.I. Acid Blue 193 is singly used, a color having a hue angle ∠h° within a range of 260° or more and 310° or less and a chroma C* within a range of 45 or less can be expressed using the single dye without mixing a plurality of colors.

For example, when the fabric as a textile-printing object is cotton, silk, wool, viscose (rayon), PA (polyamide) elastomer, or the like, the navy blue composition can express a color within the range described above without mixing a plurality of colors and can further suppress a hue change with time (light resistance). Therefore, more excellent light resistance (that is, suppression of a hue change with time) can also be realized as compared with a usual technique of realizing a navy blue hue by using a composite ink containing a plurality of dyes of combining a plurality of inks with hues (for example, realizing a navy blue hue by using an ink set having the YMCK four colors).

In addition, the dye contained in the navy blue composition of the embodiment is as described above, but is preferably the chromium- or copper-containing dye having a maximum absorption wavelength within a range of 550 nm or more and 700 nm or less.

The maximum absorption wavelength can be measured by measuring the visible region absorption spectrum of a solution prepared by dissolving the dye in a proper solvent (water, an organic solvent, or a mixture thereof) at a proper concentration. For example, even when the visible region absorption spectrum has a plurality of peaks, the maximum absorption wavelength represents the wavelength with the maximum absorbance. The maximum absorption wavelength of a dye can be measured even by using an ink composition in which the dye is dissolved, and can be measured by a diluted solution prepared by 500 to 2000 times diluting the ink composition with water. The degree of dilution may be appropriately determined according to the dye concentration.

The dye having the maximum absorption wavelength within a range of 550 nm or more and 700 nm or less typically exhibits a color having a hue angle ∠h° within a range of 220° or more and 310° or less. Any one of C.I. Reactive Blue 13, C.I. Reactive Blue 15, C.I. Reactive Blue 72, C.I. Acid Blue 193, and C.I. Direct Blue 87, which are described above, has the maximum absorption wavelength within a range of 550 nm or more and 700 nm or less.

Further, the dye contained in the navy blue composition of the embodiment is as described above, but is particularly preferably the chromium- or copper-containing dye having a maximum absorption wavelength within a range of 550 nm or more and 600 nm or less. The dye having the maximum absorption wavelength within a range of 550 nm or more and 600 nm or less typically exhibits a color having a hue angle ∠h° within a range of 260° or more and 310° or less. Any one of C.I. Reactive Blue 13 and C.I. Acid Blue 193, which are described above, has the maximum absorption wavelength within a range of 550 nm or more and 600 nm or less.

The maximum absorption wavelengths of C.I. Reactive Blue 13, C.I. Reactive Blue 15, C.I. Reactive Blue 72, C.I. Acid Blue 193, and C.I. Direct Blue 87 are shown.

Maximum absorption wavelength of C.I. Reactive Blue 13: 567 nm

Maximum absorption wavelength of C.I. Reactive Blue 15: 672 nm

Maximum absorption wavelength of C.I. Reactive Blue 72: 668 nm

Maximum absorption wavelength of C.I. Acid Blue 193: 577 nm

Maximum absorption wavelength of C.I. Direct Blue 87: 666 nm

Figure 2:
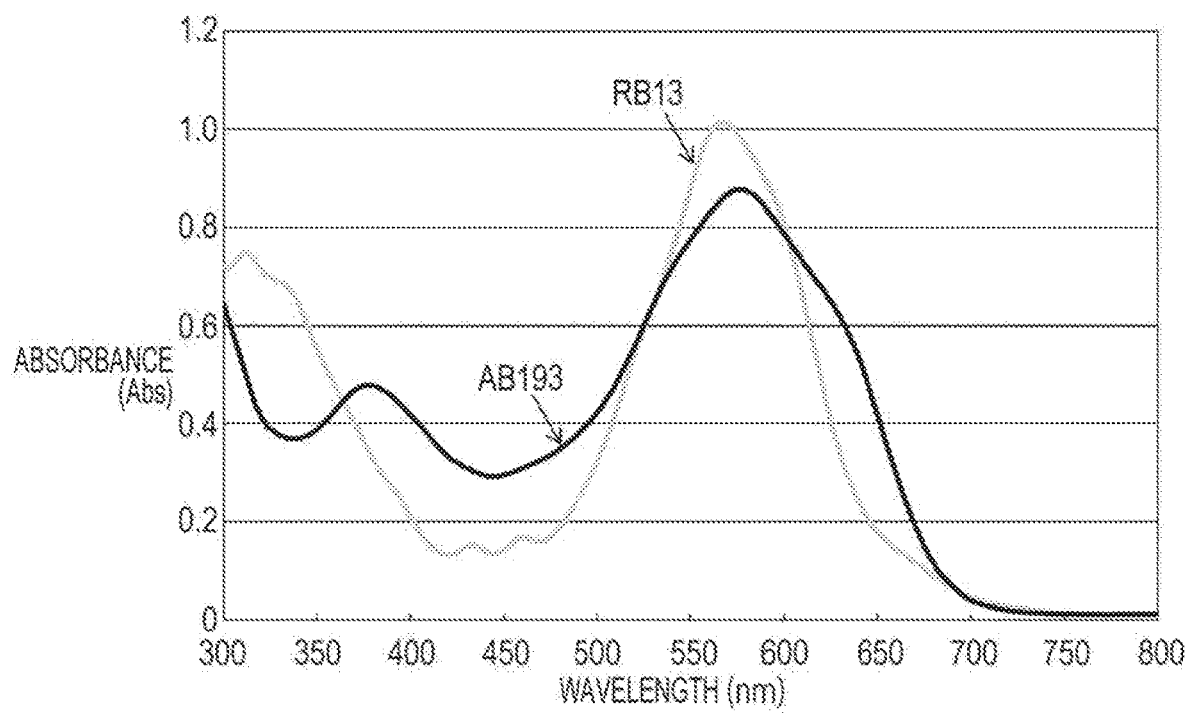
FIG. 2 is a graph showing the visible region absorption spectra of C.I. Reactive Blue 13 (RB13) and C.I. Acid Blue 193 (AB193).

FIG. 1 shows examples of the absorption spectra of C.I. Reactive Blue 13, C.I. Reactive Blue 15, and C.I. Reactive Blue 72. FIG. 2 shows examples of the absorption spectra of C.I. Reactive Blue 13 and C.I. Acid Blue 193.

The spectra shown in FIG. 1 and FIG. 2 are the results obtained by measuring an aqueous solution at a dye concentration of 10 ppm, which is prepared by using water as a solvent, by using double beam spectrophotometer U-3300 (trade name, manufactured by Hitachi High-Technologies Corporation) and a quartz cell with an optical path length of 10 mm. The method for measuring the absorption spectra of the dyes is not limited to this, and an appropriate method can be used for measurement.

1.2. Textile Printing Ink Jet Ink Composition Having a Hue Angle ∠h° Within a Range of 15° or More and 80° or Less and a Chroma C* of 65 or Less The textile printing ink jet ink composition (also referred to as the brown composition" hereinafter) having a hue angle ∠h° within a range of 15° or more and 80° or less and a chroma C* of 65 or less can develop, on the textile printing product after textile printing, colors named light brown, brown (Japanese Industrial Standard JIS custom color name), maroon, yellowish brown, reddish brown, blackish brown, and the like. Also, the brown composition can develop colors with a chroma C* of 65 or less on the textile printing product after textile printing. The chroma C* represents the distance from the origin in the a* and b* coordinates specified in the CIELAB space, and a color having a chroma C* of 65 or less is close to an achromatic color, that is, a color making a chic impression.

1.2.1. Component

The dye contained in the brown composition is not limited as long as it has a hue angle ∠h° of 15° or more and 80° or less and a chroma C* of 65 or less, which are specified in the CIELAB color space, on the textile printing product after textile printing. However, the brown composition preferably contains one or more dyes selected from a chromium-containing dye and a metal-free dye having a naphthalene skeleton in its structure.

1.2.1.1. Dye

In the case of the brown composition, examples of the dye which can easily have a hue angle ∠h° within a range of 15° or more and 80° or less, which are specified in the CIELAB color space, on a recording medium include C.I. Reactive Orange 35, C.I. Reactive Orange 12, C.I. Reactive Orange 99, C.I. Reactive Orange 13, C.I. Acid Brown 298, C.I. Acid Orange 94, and the like.

The chemical structures of C.I. Reactive Orange 35, C.I. Reactive Orange 12, C.I. Reactive Orange 99, C.I. Reactive Orange 13, C.I. Acid Brown 298, and C.I. Acid Orange 94 are represented by formula (9), formula (10), formula (11), formula (12), formula (13), and formula (14) below, respectively.

C.I. Reactive Orange 35: Formula (9)

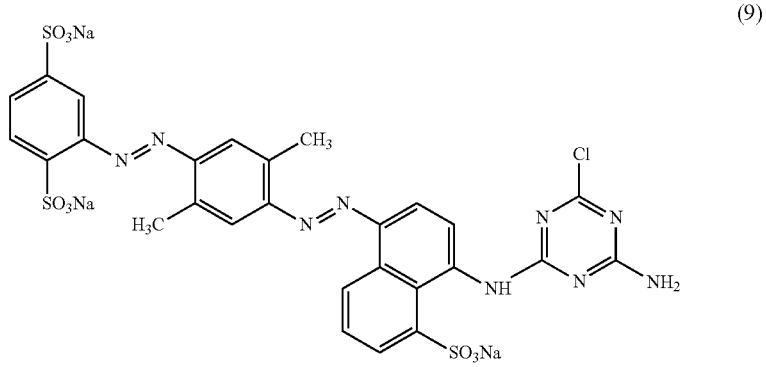

(9)

C.I. Reactive Orange 12: Formula (10)

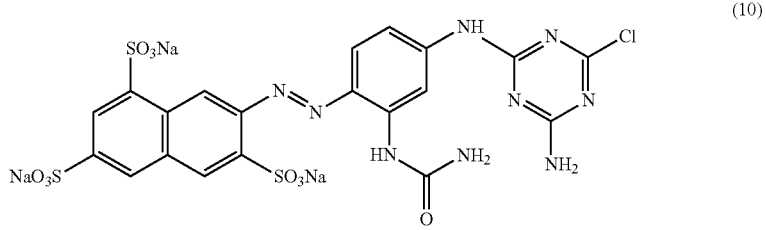

(10)

C.I. Reactive Orange 99: Formula (11)

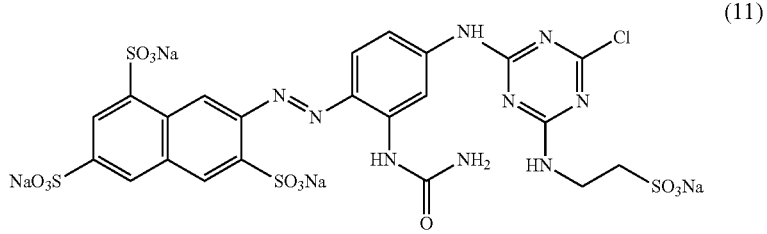

(11)

C.I. Reactive Orange 13: Formula (12)

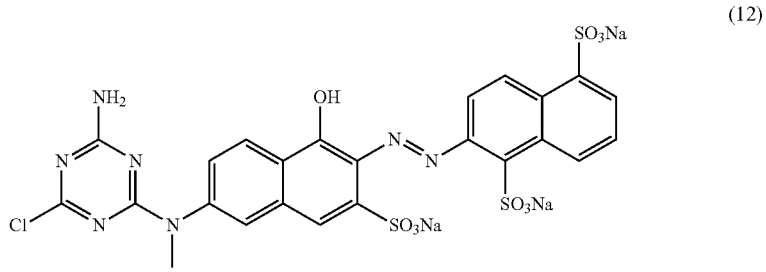

(12)

C.I. Acid Brown 298: Formula (13)

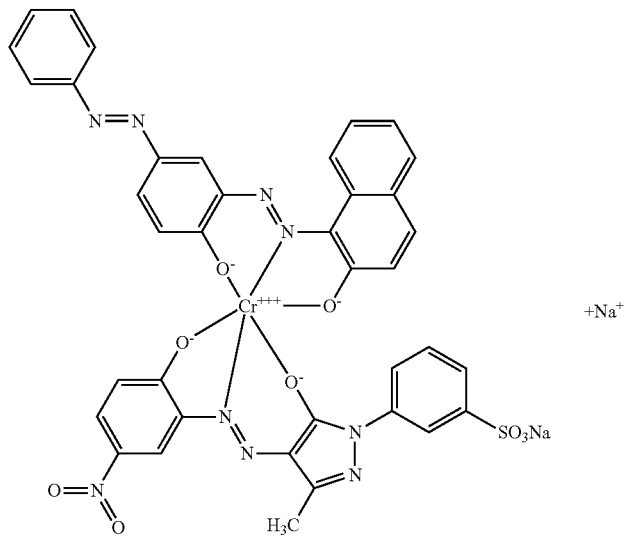

C.I. Acid Orange 94: Formula (14)

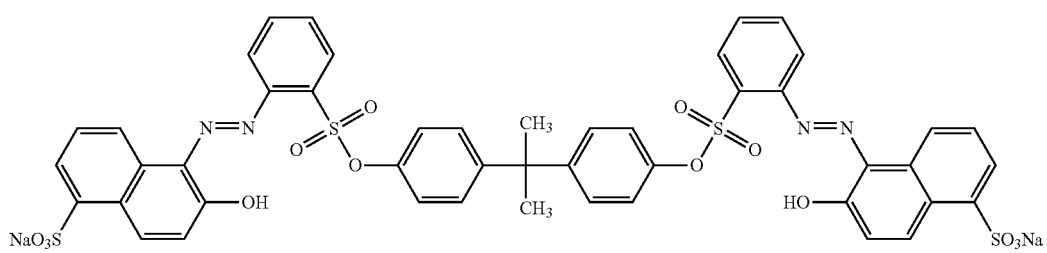

When the brown composition contains the dye described above, the textile printing product can be imparted with good color development and hue stability with time (light resistance). Also, among these dyes, each of C.I. Reactive Orange 35, C.I. Reactive Orange 12, and C.I. Reactive Orange 99 has a naphthalene skeleton. In addition, C.I. Acid Brown 298 contains chromium. Therefore, the good color development and hue stability with time (light resistance) on the textile printing product become more remarkable.

Examples of a method for adjusting the brown composition so that the hue angle ∠h° specified in the CIELAB color space falls within a range of 15° or more and 80° or less on the recording medium include some methods such as changing the dye, mixing with a dye having a different hue angle, and the like. More specific examples of the method include a method of modifying a conjugated system by changing the number and types of aromatic rings and substituents of a specified dye, a method of changing the center metal present, a method of mixing with another dye, and the like.

However, among these methods, when the hue angle is adjusted by the method of mixing the brown composition with another dye, the other dye is preferably mixed in a smaller amount. For example, the total amount relative to the whole of the brown composition is 1% by mass or less, preferably 0.5% by mass or less, more preferably 0.3% by mass or less, still more preferably 0.1% by mass or less, and particularly preferably 0.05% by mass or less. In this case, even when discoloration with time of each of the dyes occurs, a change in hue angle of a printed portion can be suppressed to be small. In addition, when another dye is mixed, the hue angles of the dyes used are more preferably close to each other. In this case, the mixing amount may be increased, and, for example, the total amount relative to the whole of the brown composition is 2% by mass or less, preferably 1% by mass or less, more preferably 0.5% by mass or less, still more preferably 0.3% by mass or less, and particularly preferably 0.1% by mass or less.

A mixture of a plurality of types of dyes can be used. However, from the viewpoint that a change in hue angle of a textile printing portion is suppressed to be small, a single type is preferably mixed. That is, the brown composition of the embodiment preferably singly uses the dye. In this case, another dye may be contained at a level at which the dye can be regarded as an impurity. That is, the total of the dye regarded as an impurity relative to the whole of the dyes contained in the brown composition is 1% by mass or less, preferably 0.1% by mass or less, more preferably 0.01% by mass or less, still more preferably 0.001% by mass or less, and particularly preferably 0.0001% by mass or less. This is more preferred because textile printing can be performed by using substantially one dye, and thus, even when discoloration with time of the dye occurs, substantially no change in hue angle occurs in a printed portion.

Examples of a method for adjusting the chroma C* to fall within a range of 65 or less include some methods such as changing the dye, mixing with a black dye, and the like. Like the other dye, the black dye is preferably used in a small amount.

The total content of the dye in the brown composition of the embodiment relative to the total mass of the textile printing ink jet ink composition is 2% by mass or more and 30% by mass or less, preferably 3% by mass or more and 15% by mass or less, and more preferably 4% by mass or more and 10% by mass or less.

Further, the dye mixed in the brown composition of the embodiment is more preferably one or more selected from C.I. Reactive Orange 35, C.I. Reactive Orange 12, C.I. Reactive Orange 99, and C.I. Acid Brown 298. Among these, C.I. Reactive Orange 35 and C.I. Acid Brown 298 are particularly preferably used. By selecting such a dye, a color having a hue angle ∠h° within a range of 15° or more and 80° or less and a chroma C* within a range of 65 or less can be expressed with good color development on the textile printing product without mixing a plurality of colors, and a change in hue with time (light resistance) can be suppressed. That is, good color development on the textile printing product can be achieved by containing at least the dye.

Further, when C.I. Reactive Orange 35 or C.I. Acid Brown 298 is singly used, a color having a hue angle ∠h° within a range of 15° or more and 80° or less and a chroma C* within a range of 65 or less can be expressed by using the single dye without mixing a plurality of colors.

For example, when the fabric used as a textile-printing object is cotton, silk, wool, viscose (rayon), PA (polyamide) elastomer, or the like, the brown composition can express a color within the range described above without mixing a plurality of colors and can further suppress a hue change with time (light resistance). Therefore, more excellent light resistance (that is, suppression of a hue change with time) can also be realized as compared with a usual technique of realizing a brown hue by using a composite ink containing a plurality of dyes or combining a plurality of inks with hues (for example, realizing a brown hue by an ink set having the YMCK four colors).

In addition, the dye contained in the brown composition of the embodiment is as described above, but is more preferably a dye having a maximum absorption wavelength within a range of 350 nm or more and 450 nm or less. The maximum absorption wavelength can be measured by the same method as described above for the navy blue composition.

The dye having the maximum absorption wavelength within a range of 350 nm or more and 450 nm or less typically exhibits a color having a hue angle ∠h° within a range of 15° or more and 80° or less. Any one of C.I. Reactive Orange 35, C.I. Reactive Orange 12, C.I. Reactive Orange 99, and C.I. Acid Brown 298, which are described above, has the maximum absorption wavelength within a range of 350 nm or more and 450 nm or less. The maximum absorption wavelengths of C.I. Reactive Orange 35, C.I. Reactive Orange 12, C.I. Reactive Orange 99, C.I. Reactive Orange 13, C.I. Acid Brown 298, and C.I. Acid Orange 94 are shown.

Maximum absorption wavelength of C.I. Reactive Orange 35: 414 nm

Maximum absorption wavelength of C.I. Reactive Orange 12: 420 nm

Maximum absorption wavelength of C.I. Reactive Orange 99: 420 nm

Maximum absorption wavelength of C.I. Acid Brown 298: 362 nm

Maximum absorption wavelength of C.I. Reactive Orange 13: 488 nm

Maximum absorption wavelength of C.I. Acid Orange 94: 480 nm

Figure 3:
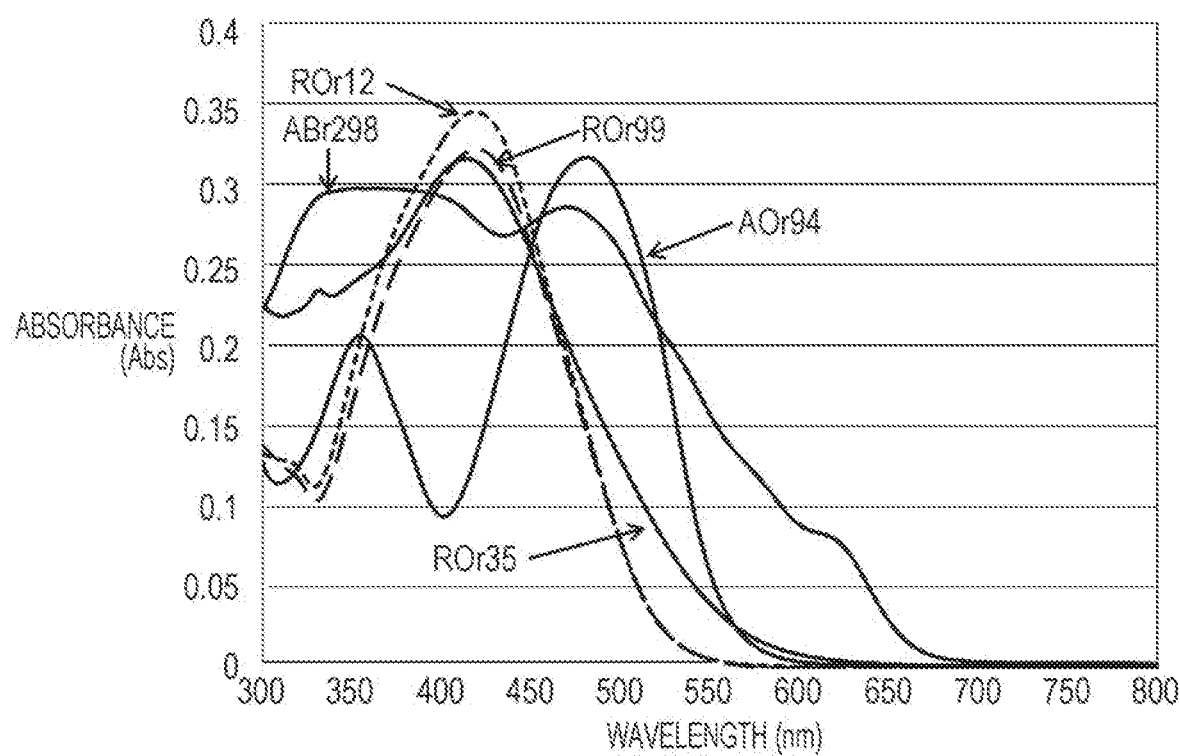
FIG. 3 is a graph showing the visible region absorption spectra of C.I. Reactive Orange 35 (ROr35), C.I. Reactive Orange 12 (ROr12), C.I. Reactive Orange 99 (ROr99), C.I. Acid Brown 298 (ABr298), and C.I. Acid Orange 94 (AOr94).

FIG. 3 shows examples of the absorption spectra of C.I. Reactive Orange 35, C.I. Reactive Orange 12, C.I. Reactive Orange 99, C.I. Acid Brown 298, and C.I. Acid Orange 94. The spectra shown in FIG. 3 are the results obtained by measuring an aqueous solution at a dye concentration of 10 ppm, which is prepared by using water as a solvent, by using double beam spectrophotometer U-3300 (trade name, manufactured by Hitachi High-Technologies Corporation) and a quartz cell with an optical path length of 10 mm. The method for measuring the absorption spectra of the dyes is not limited to this, and an appropriate method can be used for measurement.

1.2.1.2. Cyclic Amide

The brown composition of the embodiment contains a cyclic amide which is liquid at room temperature and has a normal boiling point of 190° C. or more and 260° C. or less. The cyclic amide has the function of facilitating the dissolution of the dyes described above and suppressing solidification and dyeing of the brown composition. Also, the normal boiling point of 190° C. or more and 260° C. or less sufficiently suppresses evaporation of the cyclic amide and accordingly enhances the moisturizing property. As a result, the effect of suppressing solidification and drying of the brown composition can be more significantly exhibited. The type, mixing amount, and effect, etc. of the cyclic amide are the same as the navy blue composition and are thus not described.

1.2.1.3. Other Component

Besides the above components, the brown composition of the embodiment can contain an alkyl polyol, a surfactant, a pH adjuster, water, an organic solvent, urea, a saccharide, a chelating agent, a preservative, and a fungicide. The purpose of mixing, types, mixing amounts, etc. of these components are the same as the navy blue composition and are a detailed description thereof is omitted.

When the brown composition of the embodiment contains a chromium-containing dye, chromium may separate from the chemical structure of the dye like in the navy blue composition. The brown composition of the embodiment more preferably does not contain a compound having a benzotriazole skeleton (anti-rust agent).

1.3. pH of Textile Printing Ink Jet Ink Composition

The pH of any one of the textile printing ink jet ink compositions (the navy blue composition and the brown composition) of the embodiment is 5.8 or more and 10.5 or less, preferably 6.0 or more and 10.0 or less, and more preferably 6.0 or more and 9.5 or less, and still more preferably 7.0 or more and 8.5 or less. The textile printing ink jet ink compositions having a pH within this range cause improvement in storage stability of the dyes in the ink compositions and cause little changes in color development and in hue of the resultant image, and thus a predetermined design color can be reproduced and maintained.

The pH of each of the textile printing ink jet ink compositions can be adjusted in the range described above by, for example, adjusting the liquid properties of the dyes, the type of a counter ion in the case of an ionic dye, and the balance therebetween, or the selection or the type or amount of the pH adjuster added.

1.4. Production and Physical Properties of Textile Printing Ink Jet Ink Composition Each of the textile printing ink jet ink compositions (the navy blue composition and the brown composition) of the embodiment can be produced by mixing the components described above in any desired order and, if required, removing impurities by filtration or the like. A preferred method used for mixing the components includes adding materials in order to a vessel provided with a stirrer such as a mechanical stirrer, a magnetic stirrer, or the like, and stirring and mixing the materials.

From the viewpoint of balance between the print quality and the reliability as an ink for ink jet textile printing, each of the textile printing ink jet ink compositions (the navy blue composition and the brown composition) according to the embodiment preferably has a surface tension of 20 to 40 mN/m and more preferably 22 to 35 mN/m. From the same viewpoint, each of the ink composition preferably has a viscosity at 20° C. of 1.5 to 10 mPa·s and more preferably 2 to 8 mPa·s. The surface tension and viscosity may be adjusted in the respective ranges described above by appropriately adjusting the types and amounts of the water-soluble solvent and the surfactant added, the amount of water added, and the like.

1.5. Operational Effect

The textile printing ink jet ink composition set of the embodiment can express, on the textile printing product with a small number of colors and good color development, the color of each of the textile printing ink jet ink composition having a hue angle ∠h° within a range of 260° or more and 310° or less and a chroma C* of 45 or less, which are specified in the CIELAB color space, on the textile printing product after textile printing, and the textile printing ink jet ink composition having a hue angle ∠h° within a range of 15° or more and 80° or less and a chroma C* of 65 or less, which are specified in the CIELAB color space, on the textile printing product after textile printing. Also, a hue change with time (light resistance) can be suppressed. In addition, by using in combination the textile printing ink jet ink composition having a hue angle ∠h° within a range of 260° or more and 310° or less and a chroma C* of 45 or less, which are specified in the CIELAB color space, on the textile printing product after textile printing, and the textile printing ink jet ink composition having a hue angle ∠h° within a range of 15° or more and 80° or less and a chroma C* of 65 or less, which are specified in the CIELAB color space, on the textile printing product after textile printing, a neutral color can also be expressed with the good color development, and a hue change with time can be suppressed, thereby improving light resistance. Examples of the neutral color include a color with a hue angle ∠h° within a range of 0° or more and 15° or less and a chroma C* of 40 or less, which are specified in the CIELAB color space, on the textile printing product after textile printing, and a color with a hue angle ∠h° within a range of 310° or more and 360° or less and a chroma C* of 40 or less, which are specified in the CIELAB color space, on the textile printing product after textile printing.

1.6. Others

When the navy blue composition contains the chromium-containing dye and the brown composition contains the chromium-containing dye, the textile printing ink jet ink composition set of the embodiment can be made a set using acid dyes. Thus, the color development of the textile printing product can be further improved. In addition, when the navy blue composition contains the copper-containing dye and the brown composition contains the metal-free dye, the textile printing ink jet ink composition set of the embodiment can be made a set using reactive dyes.

When either or both of the navy blue composition and the brown composition contains the cyclic amide, which is liquid at room temperature and has a normal boiling point of 190° C. or more and 260° C. or less, in an amount of 3% by mass or more and 30% by mass or less relative to the total mass of the textile printing ink jet ink compositions, the textile printing ink jet ink composition set of the embodiment can dissolve a sufficient amount of dyes and thus can achieve the better color development on the textile printing product.

In addition, when either or both of the navy blue composition and the brown composition contain the alkyl polyol having a normal boiling point of 180° C. or more and 260° C. or less in an amount of 10% by mass or more and 25% by mass or less relative to the total mass of the textile printing ink jet ink compositions, the moisturizing property of the alkyl polyol is enhanced, and thus the textile printing ink jet ink composition set of the embodiment can maintain the high recovery from clogging/standing and continuous ejection stability even when a dye easily producing foreign materials by drying is selected.

In addition, when either or both of the navy blue composition and the brown composition do not contain benzotriazole, even if a metal is separated from the dye containing a metal, the occurrence of foreign materials can be suppressed. In particular, this effect is significantly exhibited when C.I. Reactive Blue 13 is used as a dye of the navy blue composition.

The textile printing ink jet ink composition set of the embodiment can be composited of another textile printing ink jet ink composition containing a dye of any desired color and a pretreatment composition described below with any number of compositions and any number of colors.

2. RECORDING METHOD (TEXTILE PRINTING METHOD)

A recording method according to an embodiment of the invention includes ejecting and adhering, by an ink jet method, the textile printing ink jet ink composition set to a fabric containing one or more agents selected from a sizing agent, an alkali agent, an acid, and a hydrotropic agent. The steps and the like which are included and can be included in the recording method according to the embodiment are described below.

2.1. Recording Medium

The textile printing ink jet ink composition set of the embodiment is used by being adhered to a recording medium. The recording medium is not particularly limited, and various fabrics can be used. Examples of the materials constituting the fabrics include, but are not particularly limited to, natural fibers such as cotton, hemp, wool, silk, and the like, synthetic fibers such as polypropylene, polyester, acetate, triacetate, polyamide, polyurethane, and the like, and biodegradable fibers such as polylactic acid and the like. Also, mixed spun fibers of these fibers may be used. The forms of fabrics may be any one of a woven fabric, a knit, a non-woven fabric, and the like of the fibers. Among these, the fabric used in the embodiment is more preferably made of fibers containing cellulose, such as cotton, hemp, or the like. By using such a fabric, the textile printing ink jet ink compositions can exhibit more excellent dyeability.

The basis weight of the fabric used in the embodiment is within a range of 1.0 oz (ounce) or more and 10.0 oz or less, preferably 2.0 oz or more and 9.0 oz or less, more preferably 3.0 oz or more and 8.0 oz or less, and still more preferably 4.0 oz or more and 7.0 oz or less.

2.2. Pretreatment Step

The recording method according to the embodiment is performed for a fabric containing one or more agents selected from a sizing agent, an alkali agent, an acid, and a hydrotropic agent. The fabric may be prepared by any method. The recording method according to the embodiment includes a pretreatment step of applying a pretreatment composition containing one or more agents of a sizing agent, an alkali agent, an acid, and a hydrotropic agent, for example, in preparing the fabric.

Examples of a method for applying the pretreatment composition to the fabric include a method of immersing the fabric in the pretreatment composition, a method of applying the pretreatment composition by using a roll coater or the like, a method of spraying the pretreatment composition (for example, an ink jet method or a spray method), and the like. Any one of these methods can be used.

Pretreatment Composition

The pretreatment composition containing one or more agents of a sizing agent, an alkali agent, an acid, and a hydrotropic agent. The content of such a component in the pretreatment composition can be determined according to the type of the fabric and is not particularly limited.

When a reactive dye is used, the alkali agent is preferably used from the viewpoint of further improving the dyeability of the reactive dye. Examples of the alkali agent include sodium carbonate, sodium hydrogen carbonate, sodium hydroxide, trisodium phosphate, sodium acetate, and the like.

When an acid dye is used, the acid is preferably used from the viewpoint of further improving the dyeability of the dye. Examples of the acid include those for general use, such as organic acids, such as a carboxylic acid having a carboxyl group in its molecule, sulfonic aid having a sulfo group, and the like; strong acid ammonium salts; and the like. Among these, ammonium sulfate is particularly preferred.

The hydrotropic agent is preferably used in view of improvement in color development of the recorded image. Examples of the hydrotropic agent include the ureas exemplified in the item "Textile printing ink jet ink composition".

The pretreatment composition of the embodiment may contain water. Examples of the water include the same as described above in "Textile printing ink jet ink composition". The water content relative to the total mass of the pretreatment composition is 30% by mass or more, preferably 40% by mass or more, more preferably 45% by mass or more, and still more preferably 50% by mass or more.

The pretreatment composition may contain a water-soluble organic solvent. The water-soluble organic solvent can improve the wettability of the pretreatment composition to the recording medium. At least one of esters, alkylene glycol ethers, cyclic esters, alkoxyalkyl amides can be exemplified as the water-soluble solvent. Other examples of the water-soluble organic solvent include nitrogen-containing compounds, saccharides, amines, and the like. The pretreatment composition may contain the water-soluble organic solvent which can be used in the textile printing ink jet ink composition.

The pretreatment composition may contain a plurality of water-soluble organic solvents. When the water-soluble organic solvent is contained, the total content of the water-soluble organic solvent relative to the whole of the pretreatment composition is 0.1% by mass or more and 20% by mass or less, preferably 0.3% by mass or more 15% by mass or less, more preferably 0.5% by mass or more and 10% by mass or less, and still more preferably 1% by mass or more and 7% by mass or less.

The pretreatment composition may contain the sizing agent. Examples of the sizing agent include starch materials such as cone, wheat, and the like, cellulose materials such as carboxymethyl cellulose, hydroxyethyl cellulose, and the like, polysaccharides such as sodium alginate, gum Arabic, locust bean gum, tragacanth gum, guar gum, tamarind seeds, and the like, proteins such as gelatin, casein, and the like, natural water-soluble polymers such as tannin, lignin, and the like, synthetic water-soluble polymers such as polyvinyl alcohol-based compounds, polyethylene oxide-based compounds, acrylic acid-based compounds, maleic anhydride-based compounds and the like.

The pretreatment of the embodiment may contain the surfactant. Examples of the surfactant include the same as described above in "Textile printing ink jet ink composition". When the pretreatment composition contains the surfactant, the total amount of the surfactant relative to the whole of the pretreatment composition is 0.01% by mass or more and 3% by mass or less, preferably 0.05% by mass or more and 2% by mass or less, more preferably 0.1% by mass or more and 1% by mass or less, and particularly preferably 0.2% by mass or more and 0.5% by mass or less.

When the pretreatment composition contains the surfactant, the permeability and wettability of the ink applied to the pre-treated fabric can be controlled, and improvement in color development and suppression of blurring in the textile printing product can be realized.

The pretreatment composition of the embodiment may contain components which are generally used for the pretreatment composition for textile printing, such as water, a reduction inhibitor, a preservative, a fungicide, a chelating agent, a pH adjuster, a surfactant, a viscosity modifier, an antioxidant, and the like. Unlike the textile printing ink jet ink compositions, the pretreatment composition may contain an anti-rust agent (that has a benzotriazole skeleton).

Also, the pretreatment composition may be adhered to the fabric by an ink jet method. In this case, the viscosity at 20° C. is preferably 1.5 mPa·s or more and 15 mPa·s or less, more preferably 1.5 mPa·s or more and 5 mPa·s or less, and still more preferably 1.5 mPa·s or more and 3.6 mPa·s or less.

On the other hand, a method other than the ink jet method may be used for the pretreatment composition. Examples of such a method include noncontact and contact methods such as a method of applying the pretreatment composition to the fabric by using any one of various sprays, a method of applying the pretreatment composition to the fabric by immersing the fabric in the pretreatment composition, a method of applying the pretreatment composition to the fabric by using a brush or the like, and the like. Any one or combination of two or more of these methods may be used.

When the pretreatment composition is adhered to the fabric by the method other than the ink jet method, the viscosity at 20° C. may be higher than that in the ink jet method, and is, for example, 1.5 mPa·s or more and 100 mPa·s or less, preferably 1.5 mPa·s or more and 50 mPa·s or less, and more preferably 1.5 mPa·s or more and 20 mPa·s or less. The viscosity can be measured by using rheometer MCR-300 (manufactured by Physica, Inc.) and reading the viscosity at the shear rate of 200 while increasing the shear rate from 10 to 1000 in the environment of 20° C.

2.3. Printing Step

The recording method according to the embodiment includes a printing step of printing the textile printing ink jet ink composition on the fabric. Specifically, droplets of the composition ejected by an ink jet recording method are adhered to the fabric to form an image on the fabric. The ink jet recording method may be of any type, and examples thereof include a charge deflection type, a continuous type, on-demand types (piezo type and bubble jet (registered trade mane) type), and the like. Among these ink jet recording methods, a method using a piezo-type ink jet recording apparatus is particularly preferred.

2.4. Heat Treatment Step

The recording method according to the embodiment may include a heat treatment step of heat-treating the fabric printed with the textile printing ink jet ink compositions. The heat treatment improves dyeing of fibers with the dyes. The heat treatment step can be performed by using a known usual method, for example, a HT method (high-temperature steaming method), a HP method (high-pressure steaming method), a thermosol method, or the like.

From the viewpoint of decreasing damage to the fabric, the temperature in the heat treatment step is preferably within a range of 90° C. or more and 110° C. or less.

2.5. Washing Step

The recording method according to the embodiment may include a washing step of washing the textile printing product. The washing step is preferably performed after the heat treatment step and can effectively remove the dye which does not dye the fibers. The washing step can be performed by using, for example, water, and soaping may be performed if required.

2.6. Other Step

The recording method according to the embodiment may include a drying step of drying the pretreatment composition applied to the fabric after the pretreatment step and before the printing step. The pretreatment composition may be dried by natural drying, but drying by heating is preferred from the viewpoint of improving the drying rate. When the step of drying the pretreatment composition is accompanied with heating, examples of a heating method include, but are not particularly limited to, a heat press method, an ordinary-pressure steam method, a high-pressure steam method, a thermofix method, and the like. Examples of a heat source for heating include, but are not limited to, infrared rays (lamp).

2.7. Operational Effect

By using the textile printing ink jet ink composition set in the printing step according to the recording method of the embodiment, a color having a hue angle ∠h° within a range of 260° or more and 310° or less and a chroma C* of 45 or less, and a color having a hue angle ∠h° within a range of 15° or more and 80° or less and a chroma C* of 65 or less can be expressed with the good color development without mixing a plurality of colors. Also, the textile printing product in which a hue change with time (light resistance) is suppressed can be produced.

3. EXAMPLES AND COMPARATIVE EXAMPLES

The invention is more specifically described below by examples, but the invention is not limited to these examples.

3.1. Preparation of Textile Printing Ink Jet Ink Composition

Each of the textile printing ink jet ink compositions (inks 1 to 5) constituting the textile printing ink jet ink composition set was prepared according to the following method. In this item, the textile printing ink jet ink composition may be simply referred to as the "ink". Each of the inks was prepared by placing components in a vessel so as to have a composition described below, mixing and stirring the components by using a magnetic stirrer at room temperature of 1 hour, and then filtrating the resultant mixture with a membrane filter having a pore size of 1 μm. In Tables 2 to 5, a numerical value indicates % by mass, and ion exchange water was added so that the total mass of each ink was 100% by mass.

Preparation of Ink in Table 1

Regarding Reactive Ink (Examples 1 to 3 and Comparative Examples 1, 3, and 4)

Ink 1 and Ink 2

The ink 1 and ink 2 of each of the examples in Table 1 were prepared by the same method as for the composition of the ink 1 described in Example 5 shown in Table 2 except that the type of the dye was changed to the dye described in each of the examples and comparative examples in Table 1.

In Table 1, the names of dyes are abbreviated as described below. That is, for example, C.I. Reactive Blue 13 is denoted by RB13.

C.I. Reactive Blue: RB
C.I. Reactive Orange: ROr
C.I. Reactive Red: RRd
C.I. Reactive Yellow: RY
C.I. Reactive Black: RBk
C.I. Acid Blue: AB
C.I. Acid Orange: AOr
C.I. Acid Brown: ABr
C.I. Acid Red: ARd
C.I. Acid Yellow: AY
C.I. Acid Black: ABk In the examples, the term "reactive ink" represents an ink containing the dye selected from RB, ROr, RRd, RY, and RBk, and the term "acid ink" represents an ink containing the dye selected from AB, AOr, ABr, ARd, AY, and ABk.

Inks 3 to 5

Each of the inks was prepared so as to have the following composition.

Dye (described in Table 1): 7.5% by mass
1,2-Hexanediol: 4% by mass
Propylene glycol: 10% by mass
Olfine PD-002W: 0.1% by mass
Urea: 3% by mass
Proxel XL2: 0.2% by mass
Benzotriazole: 0.01% by mass
Ion exchange water: Balance Herein, Olfine PD-002W is an acetylene glycol-based surfactant manufactured by Nissin Chemical Industry Co., Ltd., and Proxel XL2 is a preservative/fungicide manufactured by Arch Chemicals, Inc.

Regarding Acid Ink (Example 4 and Comparative Examples 2, 5, and 6)

Ink 1

The ink 1 of each of the examples in Table 1 was prepared by the same method as for the composition of the ink 1 described in Example 31 shown in Table 4 except that the type of the dye was changed to the dye described in each of the example and comparative examples in Table 1.

Ink 2

The ink 2 of each of the examples in Table 1 was prepared by the same method as for the composition of the ink 2 described in Example 35 shown in Table 5 except that the type of the dye was changed to the dye described in each of the example and comparative examples in Table 1.

Inks 3 to 5

Each of the inks was prepared so as to have the following composition.

Dye (described in Table 1): 7.5% by mass
Glycerin: 15% by mass
Triethylene glycol monobutyl ether: 7% by mass
Triethanolamine: 0.5% by mass Olfine PD-002W: 0.5% by mass
Proxel XL2: 0.2% by mass
Benzotriazole: 0.01% by mass
Ion exchange water: Balance

TABLE 1

| | | | | Example | | | | Comparative Example | |
|---|---|---|---|---|---|---|---|---|---|
| | | Ink set | | 1 | 2 | 3 | 4 | 1 | 2 |
| Dye type | | Ink 1 | | RB13 | RB13 | RB13 | AB193 | RB49 | AB112 |
| | | Ink 2 | | ROr35 | ROr12 | ROr99 | ABr298 | ROr13 | AOr94 |
| | | Ink 3 | | RRd31 | RRd31 | RRd31 | ARd289 | RRd31 | ARd289 |
| | | Ink 4 | | RY2 | RY2 | RY2 | AY79 | RY2 | AY79 |
| | | Ink 5 | | RBk39 | RBk39 | RBk39 | ABk172 | RBk39 | ABk172 |
| Hue angle and chroma | | Ink 1 | | A | A | A | A | C | C |
| | | Ink 2 | | A | B | B | A | C | C |
| Light resistance evaluation results of textile printing product | Object fabric cotton 100% | Hue angle ∠h°: 0° or more and 15° or less Chroma C*: 40 or less | | A (Ink 1/ Ink 2) | B(Ink 1/ Ink 2/ Ink 5) | B(Ink 1/ Ink 2/ Ink 5) | — | D(Ink 1/ Ink 2/ Ink 5) | — |
| | | Hue angle ∠h°: 15° or more and 80° or less Chroma C*: 40 or less | | A (Ink 2) | A (Ink 2/ Ink 5) | A (Ink 2/ Ink 5) | — | D(Ink 2/ Ink 4/ Ink 5) | — |
| | | Hue angle ∠h°: 260° or more and 310° or less Chroma C*: 40 or less | | A (Ink 1) | A (Ink 1) | A (Ink 1) | — | D(Ink 1/ Ink 3/ Ink 5) | — |
| | | Hue angle ∠h°: 310° or more and 360° or less Chroma C*: 40 or less | | A (Ink 1/ Ink 2) | B(Ink 1/ Ink 2/ Ink 5) | B(Ink 1/ Ink 2/ Ink 5) | — | D(Ink 1/ Ink 2/ Ink 5) | — |
| | Object fabric PA elastomer | Hue angle ∠h°: 0° or more and 15° or less Chroma C*: 30 or less | | — | — | — | A (Ink 1/ Ink 2) | — | D(Ink 1/ Ink 2/ Ink 5) |
| | | Hue angle ∠h°: 15° or more and 80° or less Chroma C*: 30 or less | | — | — | — | A (Ink 2) | — | D(Ink 2/ Ink 4/ Ink 5) |
| | | Hue angle ∠h°: 260° or more and 310° or less Chroma C*: 30 or less | | — | — | — | A (Ink 1) | — | D(Ink 1/ Ink 3/ Ink 5) |
| | | Hue angle ∠h°: 310° or more and 360° or less Chroma C*: 30 or less | | — | — | — | A (Ink 1/ Ink 2) | — | D(Ink 1/ Ink 2/ Ink 5) |

| | | | | Comparative Example | | | |
|---|---|---|---|---|---|---|---|
| | | Ink set | | 3 | 4 | 5 | 6 |
| Dye type | | Ink 1 | | RB13 | RB49 | AB193 | AB112 |
| | | Ink 2 | | ROr13 | ROr35 | AOr94 | ABr298 |
| | | Ink 3 | | RRd31 | RRd31 | ARd289 | ARd289 |
| | | Ink 4 | | RY2 | RY2 | AY79 | AY79 |
| | | Ink 5 | | RBk39 | RBk39 | ABk172 | ABk172 |
| Hue angle and chroma | | Ink 1 | | A | C | A | C |
| | | Ink 2 | | C | A | C | A |
| Light resistance evaluation results of textile printing product | Object fabric cotton 100% | Hue angle ∠h°: 0° or more and 15° or less Chroma C*: 40 or less | | D(Ink 1/ Ink 2/ Ink 5) | D(Ink 1/ Ink 2/ Ink 5) | — | — |
| | | Hue angle ∠h°: 15° or more and 80° or less Chroma C*: 40 or less | | D(Ink 2/ Ink 4/ Ink 5) | A (Ink 2) | — | — |
| | | Hue angle ∠h°: 260° or more and 310° or less Chroma C*: 40 or less | | A (Ink 1) | D(Ink 1/ Ink 3/ Ink 5) | — | — |
| | | Hue angle ∠h°: 310° or more and 360° or less Chroma C*: 40 or less | | D(Ink 1/ Ink 2/ Ink 5) | C(Ink 1/ Ink 2/ Ink 5) | — | — |
| | Object fabric PA elastomer | Hue angle ∠h°: 0° or more and 15° or less Chroma C*: 30 or less | | — | — | C(Ink 1/ Ink 2/ Ink 5) | C(Ink 1/ Ink 2/ Ink 5) |
| | | Hue angle ∠h°: 15° or more and 80° or less Chroma C*: 30 or less | | — | — | D(Ink 2/ Ink 4/ Ink 5) | A (Ink 2) |
| | | Hue angle ∠h°: 260° or more and 310° or less Chroma C*: 30 or less | | — | — | A (Ink 1) | D(Ink 1/ Ink 3/ Ink 5) |
| | | Hue angle ∠h°: 310° or more and 360° or less Chroma C*: 30 or less | | — | — | C(Ink 1/ Ink 2/ Ink 5) | C(Ink 1/ Ink 2/ Ink 5) |

Preparation of Ink in Table 2 (Reactive Ink)

Ink 1

Each of the inks was prepared so as to have the composition shown in Table 2.

Ink 2

The ink was prepared so as to have the composition described in Example 17 in Table 3.

Inks 3 to 5

The inks were prepared so as to have the same compositions as the reactive inks 3 to 5 (for example, the inks 3 to 5 of Example 1), respectively, used in Table 1.

TABLE 2

| | | | Example | | | | | | | | | | | | |
|---|---|---|---|---|---|---|---|---|---|---|---|---|---|---|---|
| | | | 5 | 6 | 7 | 8 | 9 | 10 | 11 | 12 | 13 | 14 | 15 | 16 |
| Ink 1 | Dye | C.I. Reactive Blue 13 | 7.5 | 7.5 | 3 | 15 | 2 | 18 | 7.5 | 7.5 | 7.5 | 7.5 | 7.5 | 7.5 |
| | Cyclic amide | 2-Pyrrolidone (bp = 245° C.) | 7 | — | 7 | 7 | 7 | 7 | 7 | 7 | 7 | 7 | 2 | 31 |
| | | N-Ethyl-2-pyrrolidone (bp = 212° C.) | — | 7 | — | — | — | — | — | — | — | — | — | — |
| | Alkyl polyol | Propylene glycol (bp = 188° C.) | 7 | 7 | 7 | 7 | 7 | 7 | 7 | 7 | 3 | 12 | 7 | 7 |
| | | 1,2-Hexanediol (bp = 223° C.) | 3 | 3 | 3 | 3 | 3 | 3 | 3 | 3 | 2 | 5 | 3 | 3 |
| | | Diethylene glycol (bp = 245° C.) | 8 | 8 | 8 | 8 | 8 | 8 | — | 8 | 4 | 13 | 8 | 8 |
| | | Glycerin (bp = 290° C.) | — | — | — | — | — | — | 8 | — | — | — | — | — |
| | pH adjuster | Triethanolamine | 0.5 | 0.5 | 0.5 | 0.5 | 0.5 | 0.5 | 0.5 | 0.5 | 0.5 | 0.5 | 0.5 | 0.5 |
| | Anti-rust agent | Benzotriazole | — | — | — | — | — | — | — | 0.02 | — | — | — | — |
| | Other additives | Olfine PD-002W | 0.1 | 0.1 | 0.1 | 0.1 | 0.1 | 0.1 | 0.1 | 0.1 | 0.1 | 0.1 | 0.1 | 0.1 |
| | | Urea | 5 | 5 | 5 | 5 | 5 | 5 | 5 | 5 | 5 | 5 | 5 | 5 |
| | | Proxel XL2 | 0.1 | 0.1 | 0.1 | 0.1 | 0.1 | 0.1 | 0.1 | 0.1 | 0.1 | 0.1 | 0.1 | 0.1 |
| | Water | Ion exchange water | Balance | Balance | Balance | Balance | Balance | Balance | Balance | Balance | Balance | Balance | Balance | Balance |
| | | Total | 100 | 100 | 100 | 100 | 100 | 100 | 100 | 100 | 100 | 100 | 100 | 100 |
| Ink 2 | Dye | C.I. Reactive Orange 35 | 7.5 | 7.5 | 7.5 | 7.5 | 7.5 | 7.5 | 7.5 | 7.5 | 7.5 | 7.5 | 7.5 | 7.5 |
| Ink 3 | | C.I. Reactive Red 31 | 7.5 | 7.5 | 7.5 | 7.5 | 7.5 | 7.5 | 7.5 | 7.5 | 7.5 | 7.5 | 7.5 | 7.5 |
| Ink 4 | | C.I. Reactive Yellow 2 | 7.5 | 7.5 | 7.5 | 7.5 | 7.5 | 7.5 | 7.5 | 7.5 | 7.5 | 7.5 | 7.5 | 7.5 |
| Ink 5 | | C.I. Reactive Black 39 | 7.5 | 7.5 | 7.5 | 7.5 | 7.5 | 7.5 | 7.5 | 7.5 | 7.5 | 7.5 | 7.5 | 7.5 |
| Evaluation results | Hue angle and chroma | | A | A | A | A | A | A | A | A | A | A | A | A |
| | Light resistance | | A | A | A | A | A | A | A | A | A | A | A | A |
| | Image quality evaluation | | A | A | A | A | B | B | B | B | B | B | B | B |
| | Printing stability | Recovery from clogging/standing | A | A | A | A | A | B | B | B | B | B | B | B |
| | | Continuous ejection stability | A | A | A | A | A | B | B | B | B | B | B | B |
| | Foreign material evaluation | 25° C. | A | A | A | A | A | A | A | B | A | A | A | A |
| | | 40° C. | A | A | A | A | A | A | A | B | A | A | B | B |

Preparation of Ink in Table 3 (Reactive Ink)

Ink 2

Each of the inks was prepared so as to have the composition shown in Table 3.

Ink 1

The ink was prepared so as to have the composition described in Example 5 in Table 2.

Inks 3 to 5

The inks were prepared so as to have the same compositions as the reactive inks 3 to 5, respectively, used in Table 1.

TABLE 3

| | | | Example | | | | | | | | | | | |
|---|---|---|---|---|---|---|---|---|---|---|---|---|---|---|
| | | | 17 | 18 | 19 | 20 | 21 | 22 | 23 | 24 | 25 | 26 | 27 | 28 |
| Ink 2 | Dye | C.I. Reactive Orange 35 | 7.5 | 7.5 | 3 | 15 | 2 | 18 | 7.5 | 7.5 | 7.5 | 7.5 | 7.5 | 7.5 |
| | Cyclic amide | 2-Pyrrolidone (bp = 245° C.) | 7 | — | 7 | 7 | 7 | 7 | 7 | 7 | 7 | 7 | 2 | 31 |

TABLE 3-continued

| | | | Example | | | | | | | | | | | |
|---|---|---|---|---|---|---|---|---|---|---|---|---|---|---|
| | | | 17 | 18 | 19 | 20 | 21 | 22 | 23 | 24 | 25 | 26 | 27 | 28 |
| | | N-Ethyl-2-pyrrolidone (bp = 212° C.) | — | 7 | — | — | — | — | — | — | — | — | — | — |
| | Alkyl polyol | Propylene glycol (bp = 188° C.) | 7 | 7 | 7 | 7 | 7 | 7 | 7 | 7 | 3 | 12 | 7 | 7 |
| | | 1,2-Hexanediol (bp = 223° C.) | 3 | 3 | 3 | 3 | 3 | 3 | 3 | 3 | 2 | 5 | 3 | 3 |
| | | Diethylene glycol (bp = 245° C.) | 8 | 8 | 8 | 8 | 8 | 8 | — | 8 | 4 | 13 | 8 | 8 |
| | | Glycerin (bp = 290° C.) | — | — | — | — | — | — | 8 | — | — | — | — | — |
| | pH adjuster | Triethanolamine | 0.5 | 0.5 | 0.5 | 0.5 | 0.5 | 0.5 | 0.5 | 0.5 | 0.5 | 0.5 | 0.5 | 0.5 |
| | Anti-rust agent | Benzotriazole | — | — | — | — | — | — | — | 0.02 | — | — | — | — |
| | Other additives | Olfine PD-002W | 0.1 | 0.1 | 0.1 | 0.1 | 0.1 | 0.1 | 0.1 | 0.1 | 0.1 | 0.1 | 0.1 | 0.1 |
| | | Urea | 5 | 5 | 5 | 5 | 5 | 5 | 5 | 5 | 5 | 5 | 5 | 5 |
| | | Proxel XL2 | 0.1 | 0.1 | 0.1 | 0.1 | 0.1 | 0.1 | 0.1 | 0.1 | 0.1 | 0.1 | 0.1 | 0.1 |
| | Water | Ion exchange water | Balance | Balance | Balance | Balance | Balance | Balance | Balance | Balance | Balance | Balance | Balance | Balance |
| | | Total | 100 | 100 | 100 | 100 | 100 | 100 | 100 | 100 | 100 | 100 | 100 | 100 |
| Ink 1 | Dye | C.I. Reactive Blue 13 | 7.5 | 7.5 | 7.5 | 7.5 | 7.5 | 7.5 | 7.5 | 7.5 | 7.5 | 7.5 | 7.5 | 7.5 |
| Ink 3 | | C.I. Reactive Red 31 | 7.5 | 7.5 | 7.5 | 7.5 | 7.5 | 7.5 | 7.5 | 7.5 | 7.5 | 7.5 | 7.5 | 7.5 |
| Ink 4 | | C.I. Reactive Yellow 2 | 7.5 | 7.5 | 7.5 | 7.5 | 7.5 | 7.5 | 7.5 | 7.5 | 7.5 | 7.5 | 7.5 | 7.5 |
| Ink 5 | | C.I. Reactive Black 39 | 7.5 | 7.5 | 7.5 | 7.5 | 7.5 | 7.5 | 7.5 | 7.5 | 7.5 | 7.5 | 7.5 | 7.5 |
| Evaluation results | Hue angle and chroma | | A | A | A | A | A | A | A | A | A | A | A | A |
| | Light resistance | | A | A | A | A | A | A | A | A | A | A | A | A |
| | Image quality evaluation | | A | A | A | A | B | B | B | A | B | B | B | B |
| | Printing stability | Recovery from clogging/standing | A | A | A | A | A | B | B | A | B | B | B | B |
| | | Continuous ejection stability | A | A | A | A | A | B | B | A | B | B | B | B |
| | Foreign material evaluation | 25° C. | A | A | A | A | A | A | A | A | A | A | A | A |
| | | 40° C. | A | A | A | A | A | A | A | A | A | A | B | B |

Preparation of Ink in Table 4 (Acid Ink)

Ink 1

Each of the inks was prepared so as to have the composition shown in Table 4.

Ink 2

The ink was prepared so as to have the composition of the ink 2 described in Example 35 in Table 5.

Inks 3 to 5

The inks were prepared so as to have the same compositions as the reactive inks 3 to 5 (for example, the inks 3 to 5 of Example 4), respectively, used in Table 1.

TABLE 4

| | | | Example | | | |
|---|---|---|---|---|---|---|
| | | | 29 | 30 | 31 | 32 |
| Ink 1 | Dye | C.I. Acid Blue 193 | 7.5 | 7.5 | 7.5 | 7.5 |
| | Cyclic amide | 2-Pyrrolidone (bp = 245° C.) | 7 | — | — | — |
| | Alkyl polyol | Propylene glycol (bp = 188° C.) | 7 | 7 | — | — |
| | | 1,2-Hexanediol (bp = 223° C.) | 3 | 3 | — | — |
| | | Diethylene glycol (bp = 245° C.) | 8 | 8 | 8 | 8 |
| | | Glycerin (bp = 290° C.) | — | — | 15 | 15 |
| | Glycol ether | Triethylene glycol monobutyl ether (bp = 230° C.) | 8 | 8 | 8 | — |

TABLE 4-continued

|  |  |  | Example | | | |
|---|---|---|---|---|---|---|
|  |  |  | 29 | 30 | 31 | 32 |
|  | pH adjuster | Triethanolamine | 0.5 | 0.5 | 0.5 | 0.5 |
|  | Anti-rust agent | Benzotriazole | 0.01 | 0.01 | 0.01 | 0.01 |
|  | Other additives | Olfine PD-002W | 0.1 | 0.1 | 0.1 | 0.1 |
|  |  | Urea | 5 | 5 | 5 | 5 |
|  |  | Proxel XL2 | 0.1 | 0.1 | 0.1 | 0.1 |
|  | Water | Ion exchange water | Balance | Balance | Balance | Balance |
|  |  | Total | 100 | 100 | 100 | 100 |
| Ink 2 | Dye | C.I. Acid Brown 298 | 7.5 | 7.5 | 7.5 | 7.5 |
| Ink 3 |  | C.I. Acid Red 289 | 7.5 | 7.5 | 7.5 | 7.5 |
| Ink 4 |  | C.I. Acid Yellow 79 | 7.5 | 7.5 | 7.5 | 7.5 |
| Ink 5 |  | C.I. Acid Black 172 | 7.5 | 7.5 | 7.5 | 7.5 |
| Evaluation results |  | Hue angle and chroma | A | A | A | A |
|  |  | Light resistance | A | A | A | A |
|  |  | Image quality evaluation | A | A | A | B |
|  | Printing stability | Recovery from clogging/standing | A | A | A | B |
|  |  | Continuous ejection stability | A | A | A | B |
|  | Foreign material evaluation | 25° C. | A | A | A | A |
|  |  | 40° C. | A | A | A | A |

Preparation of Ink in Table 5 (Acid Ink)

Ink 2

Each of the inks was prepared so as to have the composition shown in Table 5.

Ink 1

The ink was prepared so as to have the composition of the ink 1 described in Example 31 in Table 4.

Inks 3 to 5

The inks were prepared so as to have the same compositions as the acid inks 3 to 5, respectively, used in Table 1.

TABLE 5

|  |  |  | Example | | | |
|---|---|---|---|---|---|---|
|  |  |  | 33 | 34 | 35 | 36 |
| Ink 2 | Dye | C.I. Acid Brown 298 | 7.5 | 7.5 | 7.5 | 7.5 |
|  | Cyclic amide | 2-Pyrrolidone (bp = 245° C.) | 7 | — | 7 | 7 |
|  | Alkyl polyol | Propylene glycol (bp = 188° C.) | 7 | 7 | — | — |
|  |  | 1,2-Hexanediol (bp = 223° C.) | 3 | 3 | — | — |
|  |  | Diethylene glycol (bp = 245° C.) | 8 | 8 | 8 | 8 |
|  |  | Glycerin (bp = 290° C.) | — | — | 15 | 15 |
|  | Glycol ether | Triethylene glycol monobutyl ether (bp = 230° C.) | 8 | 8 | 8 | — |
|  | pH adjuster | Triethanolamine | 0.5 | 0.5 | 0.5 | 0.5 |
|  | Anti-rust agent | Benzotriazole | 0.01 | 0.01 | 0.01 | 0.01 |
|  | Other additives | Olfine PD-002W | 0.1 | 0.1 | 0.1 | 0.1 |
|  |  | Urea | 5 | 5 | 5 | 5 |
|  |  | Proxel XL2 | 0.1 | 0.1 | 0.1 | 0.1 |
|  | Water | Ion exchange water | Balance | Balance | Balance | Balance |
|  |  | Total | 100 | 100 | 100 | 100 |
| Ink 1 | Dye | C.I. Acid Blue 193 | 7.5 | 7.5 | 7.5 | 7.5 |
| Ink 3 |  | C.I. Acid Red 289 | 7.5 | 7.5 | 7.5 | 7.5 |
| Ink 4 |  | C.I. Acid Yellow 79 | 7.5 | 7.5 | 7.5 | 7.5 |
| Ink 5 |  | C.I. Acid Black 172 | 7.5 | 7.5 | 7.5 | 7.5 |

TABLE 5-continued

| | | Example | | | |
|---|---|---|---|---|---|
| | | 33 | 34 | 35 | 36 |
| Evaluation results | Hue angle and chroma | A | A | A | A |
| | Light resistance | A | A | A | A |
| | Image quality evaluation | A | B | A | B |
| Printing stability | Recovery from clogging/standing | A | B | A | B |
| | Continuous ejection stability | A | B | A | B |
| Foreign material evaluation | 25° C. | A | A | A | A |
| | 40° C. | A | A | A | A |

3.3 Preparation of Pretreatment Solution

Pretreatment Solution for Reactive Ink Set

There were sufficiently mixed 5 parts by mass of polyoxyethylene diisopropyl ether (oxyethylene=30 moles), 5 parts by mass of etherified carboxymethyl cellulose, 100 parts by mass of urea (hydrotropic agent), and 10 parts by mass of sodium m-nitrobenzenesulfonate. Then, the resultant mixture was stirred at 60° C. for 30 minutes while being added little by little to 1000 parts by mass of ion exchange water. Then, 30 parts by mass of sodium carbonate (alkali agent) was further added to the solution under stirring and stirred for 10 minutes. The resultant solution was filtered with a membrane filter having a pore size of 10 μm, preparing a pretreatment solution.

Pretreatment Solution for Acid Ink Set

A pretreatment solution for an acid ink set was prepared by the same method as for preparation of the pretreatment solution for a reactive ink set except that sodium m-nitrobenzenesulfonate was not added, and ammonium sulfate was used in place of sodium carbonate as the alkali agent.

3.4. Evaluation Method (1) Regarding Tables 1 to 5

Method for Evaluating Hue Angle and Chroma of Ink 1 and Ink 2

In each of the examples, the hue angle ∠h° and chroma C* of the textile printing product were evaluated as follows. A fabric with a lightness L* of 90 (cotton 100% as a textile printing object for a reactive ink and a PA elastomer as a textile printing object for an acid ink) was used, and the pretreatment solution prepared as described above was applied to the fabric. Then, the fabric was dried by squeezing with a mangle with a pickup rate of 80%. Then, a cartridge of an ink jet printer PX-G930 (manufactured by Seiko Epson Corporation) was filled with each of the inks (ink 1 and ink 2) of each of the examples, and the ink was adhered to the pre-treated fabric with a resolution of 1440 dpi×720 dpi under the condition of an ink ejection amount of 23 mg/inch², forming an image.

Next, the fabric on which the image had been formed was steamed at 102° C. for 10 minutes, then washed with an aqueous solution containing 0.2% by mass of Laccol STA (surfactant manufactured by Meisei Chemical Works, Ltd.) at 90° C. for 10 minutes, and dried to form each evaluation sample.

The hue angle ∠h° and the chroma C* of the resultant evaluation sample were calculated from the a* and b* values determined by using a colorimeter (trade name "Spectrolino", manufactured by X-RITE, Inc., measurement conditions: light source D65, filter D65, φ2°). Similarly, the lightness L* of each fabric was measured by using a colorimeter (trade name "Spectrolino", manufactured by X-RITE, Inc., measurement conditions: light source D65, filter D65, φ2°). The calculated hue angles ∠h° and chroma C* were evaluated according to the evaluation criteria described below. Table 1 shows the evaluation results of the ink 1 and the ink 2. In Table 2 to 5, both the ink A and the ink 2 are evaluated as "A". In Tables 2 to 5, the evaluation results of the ink 1 and the ink 2 are shown without being divided from each other.

Evaluation Criteria of Ink 1

A: On all fabrics used as the textile printing object, a hue angle ∠h° of 280° or more and 300° or less and a chroma C* of 45 or less.

B: On all fabrics used as the textile printing object, a hue angle ∠h° of 260° or more and less than 280° or more than 300° and 310° or less and a chroma C* of 45 or less.

C: On all fabrics used as the textile printing object, a hue angle ∠h° of 260° or more and 310° or less and a chroma C* of more than 45.

Evaluation Criteria of Ink 2

A: On all fabrics used as the textile printing object, a hue angle ∠h° of 20° or more and 60° or less and a chroma C* of 65 or less.

B: On all fabrics used as the textile printing object, a hue angle ∠h° of 15° or more and less than 20° or more than 60° and 80° or less and a chroma C* of 65 or less.

C: On all fabrics used as the textile printing object, a hue angle ∠h° of 15° or more and 80° or less and a chroma C* of more than 65.

(2) Regarding Table 2

Method for Producing Textile Printing Product for Evaluation Using Ink Set and Method for Confirming Hue Angle and Chroma An image was printed by the same method as described above except that the cartridge of an ink jet printer PX-G930 (manufactured by Seiko Epson Corporation) was filled with each of the inks (inks 1 to 5) of each of the examples. Each of the images was formed so that the hue angle and chroma within the range (conditions for textile printing product for evaluation) shown in Table 1 were obtained, and the ink combination used for forming is shown with parentheses in the column "Results of light resistance evaluation". For example, the textile printing product for evaluation of Example 1 under conditions below is found to be formed by using the ink 1 and the ink 2.

Object fabric: cotton 100%

Conditions for textile printing product for evaluation: hue angle ∠h° of 0° or more and 15° or less and chroma C* of 40 or less Description with parentheses: (ink 1/ink 2)

Evaluation of Light Resistance

The light resistance of the textile printing product each of the examples was evaluated as follows. According to ISO 105 B02, the evaluation was performed by using each of the evaluation samples obtained for confirming the hue angle and chroma described above, and the results were evaluated according to the criteria below. Table 1 shows the results of evaluation. In this evaluation, fastness is determined by measuring discoloration, and the hue angle is not directly measured. However, at least discoloration can be determined.

A: Light resistance at grade 5 or more
B: Light resistance at grade 4 or more and less than grade 5
C: Light resistance at grade 3 or more and less than grade 4
D: Light resistance at less than grade 3

(3) Regarding Tables 2 to 5
Evaluation of Image Quality

Pretreatment, streaming, and washing were performed by the same methods as for confirming the hue angle and chroma. However, printing was performed by the operation described below to printing an image patch for evaluation. In addition, printing was performed on 100% cotton in evaluating the reactive ink set, and printing was performed on a PA elastomer in evaluating the acid ink set.

Printing Method

The cartridge of an ink jet printer PX-G930 (manufactured by Seiko Epson Corporation) was filled with the inks constituting an ink set. After filling, no occurrence of filling defect and nozzle clogging was confirmed by printing a nozzle check pattern, and then the printer was allowed to stand for 1 month in an environment of 40° C./40% RH in a state where a head was returned to a home position (that is, a state where a head cap was put on the head nozzle surface). Then, a cleaning operation was performed once, followed by printing.

In Table 2 and Table 4 in which the composition of the ink 1 was changed, image quality was evaluated by using a total 24 image patches obtained by combinations of 6 patterns, which were obtained by changing the hue angle from 260° to 310° at intervals of 10° by adjusting the amounts of the ink 1 to the ink 5 mixed, and 4 patterns, which were obtained by changing the chroma from 10 to 40 at intervals of 10.

Similarly, in Table 3 and Table 5 in which the composition of the ink 2 was changed, image quality was evaluated by using a total of 24 image patches obtained by combinations of 6 patterns, which were obtained by changing the hue angle from 20° to 70° at intervals of 10°, and 4 patterns, which were obtained by changing the chroma from 10 to 40 at intervals of 10. A series of evaluation criteria are shown below.

A: All 24 image patches obtained had a good color density and neither omission nor grainness.
B: Among the 24 image patches, 1 to 2 image patches had omission and grainness, or some image patches apparently had a low color density but all image patches had neither omission nor grainness.
C: Among the 24 image patches, 3 to 5 image patches had omission and grainness.
D: Among the 24 image patches, 6 or more image patches had omission and grainness.

Printing stability: recovery from clogging/standing

The cartridge of an ink jet printer PX-G930 (manufactured by Seiko Epson Corporation) was filled with each of the textile printing ink jet ink compositions constituting an ink set. After filling, no occurrence of filling defect and nozzle clogging was confirmed by printing a nozzle check pattern, and then the printer was allowed to stand for 1 month in an environment of 40° C./40% RH in a state where a head was returned to a home position (that is, a state where a head cap was put on the head nozzle surface). Then, after standing, a nozzle check pattern was printed, and the recovery from clogging/standing of the ink jet head with respect to each of all inks constituting the ink set was evaluated by observing the ejection conditions of nozzles. The evaluation criteria are shown below. The evaluation results are shown in Tables 2 to 5.

A: All ink compositions were normally ejected from all nozzles with one time of cleaning operation.
B: All ink compositions were normally ejected from all nozzles within a range of 2 to 5 times of cleaning operations.
C: All ink compositions were normally ejected from all nozzles within a range of 6 to 10 times of cleaning operations.
D: Eleven times or less of cleaning operation were required until all ink compositions were normally ejected from all nozzles or the ink compositions were not normally ejected from some nozzles even with 11 or more times of cleaning operations.

Printing evaluation: evaluation of continuous ejection stability

The cartridge of an ink jet printer PX-G930 (manufactured by Seiko Epson Corporation) was filled with each of the textile printing ink jet ink compositions constituting an ink set, and then continuous printing was performed on 1000 sheets of A4 plain paper. The average number of sheets allowing continuous printing without the cleaning operation was determined and evaluated according to the test method and criteria below. The evaluation results are shown in Tables 2 to 4.

Test method (1): Printing is suspended at the step where printing defect (dot disturbance, omission, or curvature) occurs during printing, and then recovered by the cleaning operation. When a plurality of times of cleaning operations are required for recovery, the requirement for a plurality of times of cleaning operations is regarded as one defect.

Test method (2): When printing is suspended due to the ink end of the ink cartridge or when the ink end can be apparently determined as the cause of printing defect, this defect is not counted. The ink cartridge is rapidly changed, and printing is resumed.

Evaluation Criteria
A: The average number of sheets allowing continuous printing was 80 or more.
B: The average number of sheets allowing continuous printing was 40 or more and less than 80.
C: The average number of sheets allowing continuous printing was 20 or more and less than 40.
D: The average number of sheets allowing continuous printing was less than 20.

Evaluation of Foreign Material

The cartridge of an ink jet printer PX-G930 (manufactured by Seiko Epson Corporation) was filled with the ink composition constituting an ink set. After filling, no occurrence of filling defect and nozzle clogging was confirmed by printing a nozzle check pattern, and then the printer was allowed to stand at 25° C. or 40° C. for 3 months in a state where a head was returned to a home position (that is, a state where a head cap was put on the head nozzle surface). Then, the head was removed from the printer, and the conditions of the nozzle tip was visually observed. In this case, foreign materials were evaluated according to the following evaluation criteria.

Evaluation Criteria
A: No foreign materials occurred. B: Nozzle clogging occurred due to the occurrence of foreign materials, but a practicable state could be recovered by maintenance such as cleaning or the like.

C: Nozzle clogging occurred due to the occurrence of foreign materials, and a practicable state could not be recovered even by maintenance such as cleaning or the like.

Evaluation of Light Resistance

The light resistance of the textile printing product each of the examples was evaluated as follows. According to ISO 105 B02, the evaluation was performed by using each of the evaluation samples obtained for confirming the hue angle and chroma described above, and the results were evaluated according to the criteria below. The evaluation results of all examples were "A". In this evaluation, fastness is determined by measuring discoloration, and the hue angle is not directly measured. However, at least discoloration can be determined.

A: Light resistance at grade 5 or higher
B: Light resistance at grade 4 or higher and lower than grade 5
C: Light resistance at grade 3 or higher and lower than grade 4
D: Light resistance at lower than grade 3

3.5. Evaluation Results

The evaluation results reveal the following.

(1) The ink set (textile printing ink jet ink composition set) of each of Examples 1 to 4 includes the textile printing ink jet ink composition (ink 1) having a hue angle ∠h° within a range of 260° or more and 310° or less and a chroma C* of 45 or less and the textile printing ink jet ink composition (ink 2) having a hue angle ∠h° within a range of 15° or more and 80° or less and a chroma C* of 65 or less.

Therefore, in the case of the reactive dye (Examples 1 to 3), with the hue angle ∠h° within a range of 260° or more and 310° or less, the chroma C* of 40 or less could be obtained by using only the ink 1. Also, in the case of the reactive dye (Examples 2 and 3), with the hue angle ∠h° within a range of 15° or more and 80° or less, the chroma C* of 40 or less could be obtained by using the ink 1 and the ink 5 (black).

On the other hand, in the case of the acid dye (Example 4), with both the hue angle ∠h° within a range of 260° or more and 310° or less and the hue angle ∠h° within a range of 15° or more and 80° or less, the chroma C* of 40 or less and 30 less could be obtained by using only the ink 2 and the ink 1, respectively.

Thus, it was found that the ink set of any one of the examples can easily express, with a single ink or a small number of inks (colors), both a color with a hue angle ∠h° within a range of 260° or more and 310° or less and a chroma C* of 45 or less and a color with a hue angle ∠h° within a range of 15° or more and 80° or less and a chroma C* of 65 or less. Further, it was found that both colors can be expressed with a single ink or a small number of inks (colors), and thus very excellent light resistance is exhibited.

(2) On the other hand, it was found that with the ink sets of Comparative Examples 1 to 6, when an image having a hue angle ∠h° within at least one of a range of 260° or more and 310° or less and a range of 15° or more and 80° or less is formed even by using either the reactive dye or the acid dye, ink color mixing is required. Therefore, an image with a mixed color has poor light resistance.

Further, the results of the comparative examples suggest that even when a hue angle ∠h° within a range of 15° or more and 80° or less and a hue angle ∠h° within a range of 260° or more and 310° or less can be obtained by color mixing, the ink 5 is required for obtaining a chroma C* of 40 or less and 30 less, and a larger number of inks (colors) is required. This tendency is remarkable with the acid dye.

(3) Although not described in Table 1, it was confirmed that with the reactive ink sets (Examples 1 to 3 and Comparative Examples 1, 3, and 4), the results established with viscose and silk are the same as those with 100% wool.

(4) Although not described in Table 1, it was confirmed that with the acid ink sets (Example 4 and Comparative Examples 2, 5, and 6), the results established with silk and wool are the same as those with the PA elastomer.

(5) Examples 5 to 28 (Table 2 and Table 3) indicate that the reactive dye ink set of any one of the examples shows good results. The main matters which can be read from these examples include that with a dye concentration of 2% by mass, the image quality is slightly degraded, while with a dye concentration of 18% by mass, image quality and printing stability are slightly degraded, that image quality and printing stability are more improved in the case not containing glycerin having a normal boiling point of 290° C., that in the case containing benzotriazole, in Example 12, foreign materials occur within a range causing no practical problem, while in Example 24, no foreign materials occur, that the evaluation results are slightly affected by the amounts of the alkyl polyol and the cyclic amide, and etc.

(6) Examples 29 to 36 (Table 4 and Table 5) indicate that the acid dye ink set of any of the examples shows good results. The main matters which can be read from these examples include that even when the cyclic amide is not contained as in Examples 30 to 32, good results are obtained, and the acid dyes have high solubility, that when C.I. Acid Brown 298 is used as in Example 34, it is more preferred to add the cyclic amide, that in the case of the acid dye, no problem occurs even when glycerin having a normal boiling point of as high as 290° C. (this is considered to be due to little inhibition of dyeing with the acid dye even when hydroxyl groups are present), that better results are obtained by mixing glycol ether, etc.

The invention is not limited to the embodiments described above, and various modifications can be made. For example, the invention includes substantially same configuration as those described above in the embodiments (for example, a configuration having the same function, method, and results or a configuration having the same purpose and effect). Also, the invention includes a configuration in which the portions not principal in the configurations described in the embodiments are replaced. Further, the invention includes a configuration in which the same operational effects as in the configurations described in the embodiments or a configuration in which the same purpose can be achieved. Further, the invention includes a configuration in which a known technique is added to the configuration described in the embodiments.

The entire disclosure of Japanese Patent Application No. 2018-022901, filed Feb. 13, 2018 is expressly incorporated by reference herein.

What is claimed is:

1. A textile printing ink jet ink composition set comprising:
a textile printing ink jet ink composition having a hue angle ∠h° within a range of 260° or more and 310° or less and a chroma C* of 45 or less, which are specified in the CIELAB color space, on a textile printing product after textile printing; and
a textile printing ink jet ink composition having a hue angle ∠h° within a range of 15° or more and 80° or less and a chroma C* of 65 or less, which are specified in the CIELAB color space, on a textile printing product after textile printing, wherein the textile printing ink jet ink composition having a hue angle ∠h° within a range of 260° or more and 310° or less and a chroma C* of 45 or less, which are specified in the CIELAB color space, on a textile printing product after textile printing contains a dye having a maximum absorption wavelength within a range of 550 nm or more and 600 nm or less.

2. The textile printing ink jet ink composition set according to claim 1, wherein the textile printing ink jet ink composition having a hue angle ∠h° within a range of 260° or more and 310° or less and a chroma C* of 45 or less, which are specified in the CIELAB color space, on a textile printing product after textile printing contains one or more dyes selected from a chromium-containing dye and a copper-containing dye.

3. The textile printing ink jet ink composition set according to claim 2, wherein the textile printing ink jet ink composition having a hue angle ∠h° within a range of 260° or more and 310° or less and a chroma C* of 45 or less, which are specified in the CIELAB color space, on a textile printing product after textile printing contains the one or more dyes selected from a chromium-containing dye and a copper-containing dye at a total content of 2% by mass or more and 15% by mass or less relative to the total mass of the textile printing ink jet ink composition.

4. The textile printing ink jet ink composition set according to claim 1, wherein the textile printing ink jet ink composition having a hue angle ∠h° within a range of 15° or more and 80° or less and a chroma C* of 65 or less, which are specified in the CIELAB color space, on a textile printing product after textile printing contains one or more dyes selected from a chromium-containing dye and a metal-free dye having a naphthalene skeleton in its structure.

5. The textile printing ink jet ink composition set according to claim 4, wherein the textile printing ink jet ink composition having a hue angle ∠h° within a range of 15° or more and 80° or less and a chroma C* of 65 or less, which are specified in the CIELAB color space, on a textile printing product after textile printing contains the one or more dyes selected from a chromium-containing dye and a metal-free dye having a naphthalene skeleton in its structure at a total content of 2% by mass or more and 15% by mass or less relative to the total mass of the textile printing ink jet ink composition.

6. The textile printing ink jet ink composition set according to claim 1, wherein the textile printing ink jet ink composition having a hue angle ∠h° within a range of 15° or more and 80° or less and a chroma C* of 65 or less, which are specified in the CIELAB color space, on a textile printing product after textile printing contains a dye having a maximum absorption wavelength within a range of 350 nm or more and 450 nm or less.

7. The textile printing ink jet ink composition set according to claim 1,
wherein the textile printing ink jet ink composition having a hue angle ∠h° within a range of 260° or more and 310° or less and a chroma C* of 45 or less, which are specified in the CIELAB color space, on a textile printing product after textile printing contains one or more dyes selected from C.I. Reactive Blue 13 and C.I. Acid Blue 193; and
the textile printing ink jet ink composition having a hue angle ∠h° within a range of 15° or more and 80° or less and a chroma C* of 65 or less, which are specified in the CIELAB color space, on a textile printing product after textile printing contains one or more dyes selected from C.I. Reactive Orange 35, C.I. Reactive Orange 12, C.I. Reactive Orange 99, and C.I. Acid Brown 298.

8. The textile printing ink jet ink composition set according to claim 1,
wherein the textile printing ink jet ink composition having a hue angle ∠h° within a range of 260° or more and 310° or less and a chroma C* of 45 or less, which are specified in the CIELAB color space, on a textile printing product after textile printing contains a chromium-containing dye; and
the textile printing ink jet ink composition having a hue angle ∠h° within a range of 15° or more and 80° or less and a chroma C* of 65 or less, which are specified in the CIELAB color space, on a textile printing product after textile printing contains a chromium-containing dye.

9. The textile printing ink jet ink composition set according to claim 1,
wherein the textile printing ink jet ink composition having a hue angle ∠h° within a range of 260° or more and 310° or less and a chroma C* of 45 or less, which are specified in the CIELAB color space, on a textile printing product after textile printing contains a copper-containing dye; and
the textile printing ink jet ink composition having a hue angle ∠h° within a range of 15° or more and 80° or less and a chroma C* of 65 or less, which are specified in the CIELAB color space, on a textile printing product after textile printing contains a metal-free dye.

10. The textile printing ink jet ink composition set according to claim 1,
wherein either or both of the following compositions contain 3% by mass or more and 30% by mass or less of a cyclic amide, which is liquid at room temperature and has a normal boiling point of 190° C. or more and 260° C. or less, relative to the total mass of the textile printing ink jet ink compositions:
the textile printing ink jet ink composition having a hue angle ∠h° within a range of 260° or more and 310° or less and a chroma C* of 45 or less, which are specified in the CIELAB color space, on a textile printing product after textile printing; and
the textile printing ink jet ink composition having a hue angle ∠h° within a range of 15° or more and 80° or less and a chroma C* of 65 or less, which are specified in the CIELAB color space, on a textile printing product after textile printing.

11. The textile printing ink jet ink composition set according claim 1,
wherein either or both of the following compositions contain 10% by mass or more and 25% by mass or less of an alkyl polyol, which has a normal boiling point of 180° C. or more and 260° C. or less, relative to the total mass of the textile printing ink jet ink compositions:
the textile printing ink jet ink composition having a hue angle ∠h° within a range of 260° or more and 310° or less and a chroma C* of 45 or less, which are specified in the CIELAB color space, on a textile printing product after textile printing; and
the textile printing ink jet ink composition having a hue angle ∠h° within a range of 15° or more and 80° or less and a chroma C* of 65 or less, which are specified in the CIELAB color space, on a textile printing product after textile printing.

12. The textile printing ink jet ink composition set according to claim 1, wherein either or both of the following compositions do not contain benzotriazole:
the textile printing ink jet ink composition having a hue angle ∠h° within a range of 260° or more and 310° or less and a chroma C* of 45 or less, which are specified in the CIELAB color space, on a textile printing product after textile printing; and
the textile printing ink jet ink composition having a hue angle ∠h° within a range of 15° or more and 80° or less and a chroma C* of 65 or less, which are specified in the CIELAB color space, on a textile printing product after textile printing.

13. The textile printing ink jet ink composition set according to claim 1,
wherein either or both of the following compositions contain 3% by mass or more and 15% by mass or less of glycol ether relative to the total mass of the textile printing ink jet ink compositions:
the textile printing ink jet ink composition having a hue angle ∠h° within a range of 260° or more and 310° or less and a chroma C* of 45 or less, which are specified in the CIELAB color space, on a textile printing product after textile printing; and
the textile printing ink jet ink composition having a hue angle ∠h° within a range of 15° or more and 80° or less and a chroma C* of 65 or less, which are specified in the CIELAB color space, on a textile printing product after textile printing.

14. A textile printing ink jet ink composition set comprising:
a textile printing ink jet ink composition containing a dye having a maximum absorption wavelength within a range of 550 nm or more and 600 nm or less; and
a textile printing ink jet ink composition containing a dye having a maximum absorption wavelength within a range of 350 nm or more and 450 nm or less.

15. The textile printing ink jet ink composition set according to claim 14,
wherein the dye having a maximum absorption wavelength within a range of 550 nm or more and 600 nm or less is one or more dyes selected from C.I. Reactive Blue 13 and C.I. Acid Blue 193; and
the dye having a maximum absorption wavelength within a range of 350 nm or more and 450 nm or less is one or more dyes selected from C.I. Reactive Orange 35, C.I. Reactive Orange 12, C.I. Reactive Orange 99, and C.I. Acid Brown 298.

16. A recording method comprising:
ejecting and adhering, by an ink jet method, the textile printing ink jet ink composition set according to claim 1 to a fabric containing one or more agents selected from a sizing agent, an alkali agent, an acid, and a hydrotropic agent.

17. A recording method comprising:
ejecting and adhering, by an ink jet method, the textile printing ink jet ink composition set according to claim 2 to a fabric containing one or more agents selected from a sizing agent, an alkali agent, an acid, and a hydrotropic agent.

18. A recording method comprising:
ejecting and adhering, by an ink jet method, the textile printing ink jet ink composition set according to claim 3 to a fabric containing one or more agents selected from a sizing agent, an alkali agent, an acid, and a hydrotropic agent.

19. A textile printing ink jet ink composition set comprising:
a textile printing ink jet ink composition having a hue angle ∠h° within a range of 260° or more and 310° or less and a chroma C* of 45 or less, which are specified in the CIELAB color space, on a textile printing product after textile printing; and
a textile printing ink jet ink composition having a hue angle ∠h° within a range of 15° or more and 80° or less and a chroma C* of 65 or less, which are specified in the CIELAB color space, on a textile printing product after textile printing,
wherein the textile printing ink jet ink composition having a hue angle ∠h° within a range of 15° or more and 80° or less and a chroma C* of 65 or less, which are specified in the CIELAB color space, on a textile printing product after textile printing contains a dye having a maximum absorption wavelength within a range of 350 nm or more and 450 nm or less.

* * * * *